United States Patent
Bodin et al.

(10) Patent No.: US 9,135,339 B2
(45) Date of Patent: Sep. 15, 2015

(54) INVOKING AN AUDIO HYPERLINK

(75) Inventors: William K. Bodin, Austin, TX (US);
David Jaramillo, Lake Worth, FL (US);
Jerry W. Redman, Cedar Park, TX (US); Derral C. Thorson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1463 days.

(21) Appl. No.: 11/352,709

(22) Filed: Feb. 13, 2006

(65) Prior Publication Data
US 2007/0192672 A1    Aug. 16, 2007

(51) Int. Cl.
G06F 17/30    (2006.01)
G06F 3/16    (2006.01)
G06F 17/22    (2006.01)
G10L 15/22    (2006.01)

(52) U.S. Cl.
CPC .......... G06F 17/30861 (2013.01); G06F 3/167 (2013.01); G06F 17/2235 (2013.01); G10L 2015/223 (2013.01)

(58) Field of Classification Search
CPC ... G10L 15/22; G10L 2015/223; G10L 15/00; G10L 17/22; G10L 15/32; G06F 17/2235; G06F 3/167; G06F 17/30861
USPC ................ 715/207, 208; 704/270.1, 271, 275
See application file for complete search history.

(56) References Cited

U.S. PATENT DOCUMENTS

| | | |
|---|---|---|
| 4,785,408 A | 11/1988 | Britton et al. |
| 5,341,469 A | 8/1994 | Rossberg et al. |
| 5,377,354 A | 12/1994 | Scannell et al. |
| 5,564,043 A | 10/1996 | Siefert |
| 5,566,291 A | 10/1996 | Boulton et al. |
| 5,613,032 A | 3/1997 | Cruz et al. |
| 5,715,370 A | 2/1998 | Luther et al. |
| 5,732,216 A | 3/1998 | Logan |
| 5,774,131 A | 6/1998 | Kim |
| 5,819,220 A | 10/1998 | Sarukkai |
| 5,884,266 A | 3/1999 | Dvorak |
| 5,890,117 A | 3/1999 | Silverman |

(Continued)

FOREIGN PATENT DOCUMENTS

| | | |
|---|---|---|
| CN | 1123075 | 5/1996 |
| CN | 1123075 A | 5/1996 |

(Continued)

OTHER PUBLICATIONS

Braun N. & Doner R., Uing Sonic Hyperlinks in Web-TV, International Conf. on Auditory Displays (ICAD '98), Nov. 1, 1998, XP002428659, Glasgow UK.*

(Continued)

Primary Examiner — Adam M Queler
(74) Attorney, Agent, or Firm — Brevetto Law Group

(57) ABSTRACT

Methods, systems, and computer program products are provided for invoking an audio hyperlink. Embodiments include identifying a predetermined playback time in an audio file pre-designated as having an associated audio hyperlink; playing an audio indication of the audio hyperlink at the predetermined playback time; receiving from a user an instruction to invoke the audio hyperlink; identifying a URI associated with the audio hyperlink; and invoking the URI. The audio file may include an audio subcomponent of a file also including video.

21 Claims, 10 Drawing Sheets

(56) References Cited

U.S. PATENT DOCUMENTS

| | | |
|---|---|---|
| 5,892,825 A | 4/1999 | Mages |
| 5,901,287 A | 5/1999 | Bull |
| 5,903,727 A | 5/1999 | Nielsen |
| 5,911,776 A | 6/1999 | Guck |
| 5,978,463 A | 11/1999 | Jurkevics et al. |
| 6,006,187 A | 12/1999 | Tanenblatt |
| 6,012,098 A | 1/2000 | Bayeh et al. |
| 6,029,135 A | 2/2000 | Krasle |
| 6,032,260 A | 2/2000 | Sasmazel |
| 6,044,347 A | 3/2000 | Abella et al. |
| 6,055,525 A | 4/2000 | Nusbickel |
| 6,064,961 A | 5/2000 | Hanson |
| 6,088,026 A | 7/2000 | Williams |
| 6,092,121 A | 7/2000 | Bennett et al. |
| 6,115,482 A | 9/2000 | Sears et al. |
| 6,115,686 A | 9/2000 | Chung et al. |
| 6,141,693 A | 10/2000 | Perlman |
| 6,178,511 B1 | 1/2001 | Cohen |
| 6,199,076 B1 | 3/2001 | Logan et al. |
| 6,233,318 B1 | 5/2001 | Picard et al. |
| 6,240,391 B1 | 5/2001 | Ball |
| 6,266,649 B1 | 7/2001 | Linden |
| 6,272,461 B1 | 8/2001 | Meredith et al. |
| 6,282,511 B1 | 8/2001 | Mayer |
| 6,282,512 B1 * | 8/2001 | Hemphill ............... 704/270.1 |
| 6,311,194 B1 | 10/2001 | Sheth |
| 6,317,714 B1 | 11/2001 | Del Castillo et al. |
| 6,324,511 B1 | 11/2001 | Kiraly et al. |
| 6,397,185 B1 | 5/2002 | Komissarchik et al. |
| 6,463,440 B1 | 10/2002 | Hind |
| 6,468,084 B1 | 10/2002 | MacMillan |
| 6,480,860 B1 | 11/2002 | Monday |
| 6,510,413 B1 | 1/2003 | Walker |
| 6,519,617 B1 | 2/2003 | Wanderski |
| 6,532,477 B1 * | 3/2003 | Tang et al. ............... 707/104.1 |
| 6,563,770 B1 | 5/2003 | Kokhab |
| 6,568,939 B1 | 5/2003 | Edgar |
| 6,574,599 B1 | 6/2003 | Lim et al. |
| 6,593,943 B1 | 7/2003 | MacPhail |
| 6,594,637 B1 | 7/2003 | Furukawa et al. |
| 6,604,076 B1 * | 8/2003 | Holley et al. ............... 704/270.1 |
| 6,611,876 B1 | 8/2003 | Barrett et al. |
| 6,644,973 B2 | 11/2003 | Oster |
| 6,684,370 B1 | 1/2004 | Sikorsky et al. |
| 6,687,678 B1 | 2/2004 | Yorimatsu et al. |
| 6,731,993 B1 | 5/2004 | Carter et al. |
| 6,771,743 B1 | 8/2004 | Butler |
| 6,792,407 B2 | 9/2004 | Kibre et al. |
| 6,802,041 B1 | 10/2004 | Rehm |
| 6,810,146 B2 | 10/2004 | Loui et al. |
| 6,832,196 B2 | 12/2004 | Reich |
| 6,839,669 B1 | 1/2005 | Gould |
| 6,859,527 B1 | 2/2005 | Banks et al. |
| 6,901,403 B1 | 5/2005 | Bata et al. |
| 6,912,691 B1 | 6/2005 | Dodrill |
| 6,931,587 B1 | 8/2005 | Krause |
| 6,944,214 B1 | 9/2005 | Gilbert |
| 6,944,591 B1 | 9/2005 | Raghunandan |
| 6,965,569 B1 | 11/2005 | Carolan |
| 6,976,082 B1 | 12/2005 | Ostermann |
| 6,990,451 B2 | 1/2006 | Case et al. |
| 6,992,451 B2 | 1/2006 | Kamio et al. |
| 6,993,476 B1 | 1/2006 | Dutta |
| 7,017,120 B2 | 3/2006 | Shnier |
| 7,031,477 B1 | 4/2006 | Mella et al. |
| 7,039,643 B2 | 5/2006 | Sena |
| 7,046,772 B1 | 5/2006 | Moore |
| 7,054,818 B2 | 5/2006 | Sharma et al. |
| 7,062,437 B2 | 6/2006 | Kovales et al. |
| 7,065,222 B2 | 6/2006 | Wilcock |
| 7,069,092 B2 | 6/2006 | Wiser et al. |
| 7,096,183 B2 | 8/2006 | Junqua |
| 7,107,281 B2 | 9/2006 | De La Huerga |
| 7,113,909 B2 | 9/2006 | Nukaga et al. |
| 7,120,702 B2 | 10/2006 | Huang |
| 7,130,850 B2 | 10/2006 | Russell-Falla |
| 7,139,713 B2 | 11/2006 | Falcon |
| 7,149,694 B1 | 12/2006 | Harb et al. |
| 7,149,810 B1 | 12/2006 | Miller et al. |
| 7,162,502 B2 | 1/2007 | Suarez et al. |
| 7,171,411 B1 | 1/2007 | Lewis |
| 7,178,100 B2 | 2/2007 | Call |
| 7,191,133 B1 | 3/2007 | Pettay |
| 7,313,528 B1 | 12/2007 | Miller |
| 7,346,649 B1 | 3/2008 | Wong |
| 7,349,949 B1 | 3/2008 | Connor et al. |
| 7,356,470 B2 | 4/2008 | Roth |
| 7,366,712 B2 | 4/2008 | He |
| 7,369,988 B1 | 5/2008 | Thenthiruperai et al. |
| 7,386,575 B2 | 6/2008 | Bashant et al. |
| 7,392,102 B2 | 6/2008 | Sullivan et al. |
| 7,430,510 B1 | 9/2008 | De Fabbrizio et al. |
| 7,433,819 B2 | 10/2008 | Adams et al. |
| 7,437,408 B2 | 10/2008 | Schwartz |
| 7,454,346 B1 | 11/2008 | Dodrill |
| 7,505,978 B2 | 3/2009 | Bodin |
| 7,542,903 B2 | 6/2009 | Azara et al. |
| 7,552,055 B2 | 6/2009 | Lecoeuche |
| 7,561,932 B1 | 7/2009 | Holmes et al. |
| 7,568,213 B2 | 7/2009 | Carhart et al. |
| 7,657,006 B2 | 2/2010 | Woodring |
| 7,664,641 B1 | 2/2010 | Pettay et al. |
| 7,685,525 B2 | 3/2010 | Kumar |
| 7,729,478 B1 | 6/2010 | Coughlan et al. |
| 7,873,520 B2 | 1/2011 | Paik |
| 7,890,517 B2 | 2/2011 | Angelo |
| 7,949,681 B2 | 5/2011 | Bodin |
| 7,996,754 B2 | 8/2011 | Bodin |
| 2001/0014146 A1 | 8/2001 | Beyda et al. |
| 2001/0027396 A1 | 10/2001 | Sato |
| 2001/0040900 A1 | 11/2001 | Salmi |
| 2001/0047349 A1 | 11/2001 | Easty et al. |
| 2001/0049725 A1 | 12/2001 | Kosuge |
| 2001/0054074 A1 | 12/2001 | Hayashi |
| 2002/0013708 A1 | 1/2002 | Walker |
| 2002/0015480 A1 | 2/2002 | Daswani et al. |
| 2002/0032564 A1 | 3/2002 | Ehsani |
| 2002/0032776 A1 | 3/2002 | Hasegawa |
| 2002/0039426 A1 | 4/2002 | Takemoto |
| 2002/0054090 A1 | 5/2002 | Silva |
| 2002/0057678 A1 | 5/2002 | Jiang et al. |
| 2002/0062216 A1 | 5/2002 | Guenther |
| 2002/0083013 A1 | 6/2002 | Rollins |
| 2002/0095292 A1 | 7/2002 | Mittal |
| 2002/0120451 A1 | 8/2002 | Kato et al. |
| 2002/0120693 A1 | 8/2002 | Rudd et al. |
| 2002/0128837 A1 | 9/2002 | Morin |
| 2002/0130891 A1 | 9/2002 | Singer |
| 2002/0143414 A1 | 10/2002 | Wilcock |
| 2002/0151998 A1 | 10/2002 | Kemppi et al. |
| 2002/0152210 A1 | 10/2002 | Johnson |
| 2002/0169770 A1 | 11/2002 | Kim et al. |
| 2002/0173964 A1 | 11/2002 | Reich |
| 2002/0178007 A1 | 11/2002 | Slotznick |
| 2002/0193894 A1 | 12/2002 | Terada et al. |
| 2002/0194286 A1 | 12/2002 | Matsuura |
| 2002/0194480 A1 | 12/2002 | Nagao |
| 2002/0198714 A1 | 12/2002 | Zhou |
| 2002/0198720 A1 | 12/2002 | Takagi |
| 2003/0018727 A1 | 1/2003 | Yamamoto |
| 2003/0028380 A1 | 2/2003 | Freeland et al. |
| 2003/0033331 A1 | 2/2003 | Sena |
| 2003/0055835 A1 | 3/2003 | Roth |
| 2003/0055868 A1 | 3/2003 | Fletcher |
| 2003/0078780 A1 | 4/2003 | Kochanski et al. |
| 2003/0103606 A1 | 6/2003 | Rhie |
| 2003/0108184 A1 | 6/2003 | Brown et al. |
| 2003/0110185 A1 | 6/2003 | Rhoads |
| 2003/0110272 A1 | 6/2003 | du Castel |
| 2003/0110297 A1 | 6/2003 | Tabatabai |
| 2003/0115056 A1 | 6/2003 | Gusler |
| 2003/0115064 A1 | 6/2003 | Gusler |
| 2003/0115289 A1 | 6/2003 | Chinn et al. |
| 2003/0126293 A1 | 7/2003 | Bushey |

(56) References Cited

U.S. PATENT DOCUMENTS

| | | |
|---|---|---|
| 2003/0132953 A1 | 7/2003 | Johnson |
| 2003/0145062 A1 | 7/2003 | Sharma et al. |
| 2003/0151618 A1 | 8/2003 | Johnson et al. |
| 2003/0156130 A1 | 8/2003 | James et al. |
| 2003/0158737 A1 | 8/2003 | Csicsatka |
| 2003/0160770 A1 | 8/2003 | Zimmerman |
| 2003/0163211 A1 | 8/2003 | Van Der Meulen |
| 2003/0167234 A1 | 9/2003 | Bodmer |
| 2003/0172066 A1 | 9/2003 | Cooper |
| 2003/0182000 A1 | 9/2003 | Muesch et al. |
| 2003/0182124 A1 | 9/2003 | Khan |
| 2003/0187668 A1 | 10/2003 | Ullmann et al. |
| 2003/0187726 A1 | 10/2003 | Bull et al. |
| 2003/0188255 A1 | 10/2003 | Shimizu |
| 2003/0212654 A1 | 11/2003 | Harper |
| 2003/0225599 A1 | 12/2003 | Mueller |
| 2003/0229847 A1 | 12/2003 | Kim |
| 2004/0003394 A1 | 1/2004 | Ramaswamy |
| 2004/0034653 A1 | 2/2004 | Maynor |
| 2004/0041835 A1 | 3/2004 | Lu |
| 2004/0044665 A1 | 3/2004 | Nwabueze |
| 2004/0049477 A1 | 3/2004 | Powers et al. |
| 2004/0067472 A1 | 4/2004 | Polanyi et al. |
| 2004/0068552 A1 | 4/2004 | Kotz |
| 2004/0088063 A1 | 5/2004 | Hoshi et al. |
| 2004/0088349 A1 | 5/2004 | Beck |
| 2004/0093350 A1 | 5/2004 | Alexander et al. |
| 2004/0107125 A1 | 6/2004 | Guheen |
| 2004/0120479 A1 | 6/2004 | Creamer et al. |
| 2004/0128276 A1 | 7/2004 | Scanlon et al. |
| 2004/0143430 A1 | 7/2004 | Said et al. |
| 2004/0153178 A1 | 8/2004 | Koch et al. |
| 2004/0172254 A1 | 9/2004 | Sharma et al. |
| 2004/0199375 A1 | 10/2004 | Ehsani |
| 2004/0201609 A1 | 10/2004 | Obrador |
| 2004/0210626 A1 | 10/2004 | Bodin et al. |
| 2004/0225499 A1 | 11/2004 | Wang et al. |
| 2004/0254851 A1 | 12/2004 | Himeno |
| 2004/0267387 A1 | 12/2004 | Samadani |
| 2004/0267774 A1 | 12/2004 | Lin et al. |
| 2005/0004992 A1 | 1/2005 | Horstmann |
| 2005/0015254 A1 | 1/2005 | Beaman |
| 2005/0015718 A1 | 1/2005 | Sambhus et al. |
| 2005/0021826 A1 | 1/2005 | Kumar |
| 2005/0043940 A1 | 2/2005 | Elder |
| 2005/0045373 A1 | 3/2005 | Born |
| 2005/0065625 A1 | 3/2005 | Sass |
| 2005/0071780 A1 | 3/2005 | Muller |
| 2005/0076365 A1 | 4/2005 | Popov |
| 2005/0088981 A1 | 4/2005 | Woodruff et al. |
| 2005/0108521 A1 | 5/2005 | Silhavy |
| 2005/0114139 A1 | 5/2005 | Dincer |
| 2005/0119894 A1 | 6/2005 | Cutler et al. |
| 2005/0120083 A1 | 6/2005 | Aizawa et al. |
| 2005/0137875 A1 | 6/2005 | Kim et al. |
| 2005/0138063 A1 | 6/2005 | Bazot et al. |
| 2005/0144002 A1 | 6/2005 | Ps |
| 2005/0144022 A1 | 6/2005 | Evans |
| 2005/0152344 A1 | 7/2005 | Chiu et al. |
| 2005/0154580 A1 | 7/2005 | Horowitz |
| 2005/0154969 A1 | 7/2005 | Bodin et al. |
| 2005/0190897 A1 | 9/2005 | Eberle et al. |
| 2005/0195999 A1 | 9/2005 | Takemura et al. |
| 2005/0203887 A1 | 9/2005 | Joshi et al. |
| 2005/0203959 A1 | 9/2005 | Muller |
| 2005/0203960 A1 | 9/2005 | Suarez et al. |
| 2005/0232242 A1 | 10/2005 | Karaoguz |
| 2005/0234727 A1 | 10/2005 | Chiu |
| 2005/0251513 A1 | 11/2005 | Tenazas |
| 2005/0261905 A1 | 11/2005 | Pyo et al. |
| 2005/0262119 A1 | 11/2005 | Mawdsley |
| 2005/0286705 A1 | 12/2005 | Contolini et al. |
| 2005/0288926 A1 | 12/2005 | Benco |
| 2006/0008252 A1 | 1/2006 | Kim |
| 2006/0008258 A1 | 1/2006 | Kawana |
| 2006/0020662 A1 | 1/2006 | Robinson |
| 2006/0031447 A1 | 2/2006 | Holt |
| 2006/0041549 A1 | 2/2006 | Gundersen et al. |
| 2006/0048212 A1 | 3/2006 | Tsuruoka |
| 2006/0050794 A1 | 3/2006 | Tan |
| 2006/0050996 A1 | 3/2006 | King et al. |
| 2006/0052089 A1 | 3/2006 | Khurana et al. |
| 2006/0075224 A1 | 4/2006 | Tao |
| 2006/0085199 A1 | 4/2006 | Jain |
| 2006/0095848 A1 | 5/2006 | Naik |
| 2006/0100877 A1 | 5/2006 | Zhang et al. |
| 2006/0112844 A1 | 6/2006 | Hiller |
| 2006/0114987 A1 | 6/2006 | Roman |
| 2006/0123082 A1 | 6/2006 | Digate et al. |
| 2006/0129403 A1 | 6/2006 | Liao et al. |
| 2006/0136449 A1 | 6/2006 | Parker |
| 2006/0140360 A1 | 6/2006 | Crago |
| 2006/0149781 A1 | 7/2006 | Blankinship |
| 2006/0155698 A1 | 7/2006 | Vayssiere |
| 2006/0159109 A1 | 7/2006 | Lamkin |
| 2006/0165104 A1 | 7/2006 | Kaye |
| 2006/0168507 A1 | 7/2006 | Hansen |
| 2006/0173985 A1 | 8/2006 | Moore |
| 2006/0184679 A1 | 8/2006 | Izdepski |
| 2006/0190616 A1 | 8/2006 | Mayerhofer |
| 2006/0193450 A1 | 8/2006 | Flynt |
| 2006/0200743 A1 | 9/2006 | Thong et al. |
| 2006/0206533 A1 | 9/2006 | MacLaurin |
| 2006/0224739 A1 | 10/2006 | Anantha |
| 2006/0233327 A1 | 10/2006 | Roberts |
| 2006/0242663 A1 | 10/2006 | Gogerty |
| 2006/0253699 A1 | 11/2006 | Della-Libera |
| 2006/0265503 A1 | 11/2006 | Jones et al. |
| 2006/0282317 A1 | 12/2006 | Rosenberg |
| 2006/0282822 A1 | 12/2006 | Weng |
| 2006/0287745 A1 | 12/2006 | Richenstein et al. |
| 2006/0288011 A1 | 12/2006 | Gandhi |
| 2007/0005339 A1 | 1/2007 | Jaquinta |
| 2007/0027692 A1 | 2/2007 | Sharma et al. |
| 2007/0027859 A1 | 2/2007 | Harney et al. |
| 2007/0027958 A1 | 2/2007 | Haslam |
| 2007/0043462 A1 | 2/2007 | Terada et al. |
| 2007/0043735 A1 | 2/2007 | Bodin et al. |
| 2007/0043758 A1 | 2/2007 | Bodin et al. |
| 2007/0043759 A1 | 2/2007 | Bodin et al. |
| 2007/0061132 A1 | 3/2007 | Bodin |
| 2007/0061229 A1 | 3/2007 | Ramer |
| 2007/0061266 A1 | 3/2007 | Moore |
| 2007/0061371 A1 | 3/2007 | Bodin et al. |
| 2007/0061401 A1 | 3/2007 | Bodin et al. |
| 2007/0061711 A1 | 3/2007 | Bodin |
| 2007/0061712 A1 | 3/2007 | Bodin |
| 2007/0073728 A1 | 3/2007 | Klein, Jr. |
| 2007/0077921 A1 | 4/2007 | Hayashi |
| 2007/0078655 A1 | 4/2007 | Semkow |
| 2007/0083540 A1 | 4/2007 | Gundla |
| 2007/0091206 A1 | 4/2007 | Bloebaum |
| 2007/0100628 A1 | 5/2007 | Bodin et al. |
| 2007/0100629 A1 | 5/2007 | Bodin et al. |
| 2007/0100787 A1 | 5/2007 | Lim et al. |
| 2007/0100836 A1 | 5/2007 | Eichstaedt et al. |
| 2007/0101274 A1 | 5/2007 | Kurlander |
| 2007/0101313 A1 | 5/2007 | Bodin et al. |
| 2007/0112844 A1 | 5/2007 | Tribble |
| 2007/0118426 A1 | 5/2007 | Barnes, Jr. |
| 2007/0124458 A1 | 5/2007 | Kumar |
| 2007/0124802 A1 | 5/2007 | Anton, Jr. |
| 2007/0130589 A1 | 6/2007 | Davis |
| 2007/0138999 A1 | 6/2007 | Lee et al. |
| 2007/0147274 A1 | 6/2007 | Vasa |
| 2007/0165538 A1 | 7/2007 | Bodin |
| 2007/0168191 A1 | 7/2007 | Bodin et al. |
| 2007/0168194 A1 | 7/2007 | Bodin et al. |
| 2007/0174326 A1 | 7/2007 | Schwartz |
| 2007/0191008 A1 | 8/2007 | Bucher |
| 2007/0192327 A1 | 8/2007 | Bodin |
| 2007/0192672 A1 | 8/2007 | Bodin |
| 2007/0192673 A1 | 8/2007 | Bodin |
| 2007/0192674 A1 | 8/2007 | Bodin |

(56) References Cited

U.S. PATENT DOCUMENTS

| | | | |
|---|---|---|---|
| 2007/0192675 | A1 | 8/2007 | Bodin |
| 2007/0192676 | A1 | 8/2007 | Bodin |
| 2007/0192683 | A1 | 8/2007 | Bodin |
| 2007/0192684 | A1 | 8/2007 | Bodin |
| 2007/0198267 | A1 | 8/2007 | Jones et al. |
| 2007/0208687 | A1 | 9/2007 | O'Conor |
| 2007/0213857 | A1 | 9/2007 | Bodin |
| 2007/0213986 | A1 | 9/2007 | Bodin |
| 2007/0214147 | A1 | 9/2007 | Bodin |
| 2007/0214148 | A1 | 9/2007 | Bodin |
| 2007/0214149 | A1 | 9/2007 | Bodin |
| 2007/0214485 | A1 | 9/2007 | Bodin |
| 2007/0220024 | A1 | 9/2007 | Putterman |
| 2007/0239837 | A1 | 10/2007 | Jablokov |
| 2007/0253699 | A1 | 11/2007 | Yen |
| 2007/0276837 | A1 | 11/2007 | Bodin |
| 2007/0276865 | A1 | 11/2007 | Bodin |
| 2007/0276866 | A1 | 11/2007 | Bodin |
| 2007/0277088 | A1 | 11/2007 | Bodin |
| 2007/0277233 | A1 | 11/2007 | Bodin |
| 2008/0034278 | A1 | 2/2008 | Tsou |
| 2008/0052415 | A1 | 2/2008 | Kellerman |
| 2008/0082576 | A1 | 4/2008 | Bodin |
| 2008/0082635 | A1 | 4/2008 | Bodin |
| 2008/0155616 | A1 | 6/2008 | Logan et al. |
| 2008/0161948 | A1 | 7/2008 | Bodin |
| 2008/0162131 | A1 | 7/2008 | Bodin |
| 2008/0162559 | A1 | 7/2008 | Bodin |
| 2008/0275893 | A1 | 11/2008 | Bodin |
| 2009/0271178 | A1 | 10/2009 | Bodin |

FOREIGN PATENT DOCUMENTS

| | | |
|---|---|---|
| CN | 1298173 | 6/2001 |
| CN | 1298173 A | 6/2001 |
| CN | 1368719 A | 4/2008 |
| CN | 1368719 C | 4/2008 |
| EP | 1197884 A2 | 4/2002 |
| GB | 2369955 | 6/2002 |
| GB | 2369955 A | 6/2002 |
| KR | 2001-0071517 | 7/2001 |
| KR | 1020010071517 A | 7/2001 |
| KR | 2004-0078888 | 9/2004 |
| KR | 1020040078888 A | 9/2004 |
| WO | WO 0182139 | 11/2001 |
| WO | WO 0106846 | 11/2005 |

OTHER PUBLICATIONS

Braun N. & Doner R., "Using Sonic Hyperlinks in Web-TV", International Conf. on Auditory Displays (ICAD '98), Nov. 1, 1998, XP 002428659, Glasgow, UK.*
Hoschka et al., "Synchronized Multimedia Integration Language (SMIL) 1.0 Specification", Apr. 9, 1998, doi: http://www.w3.org/TR/1998/PR-smil-19980409/#anchor.*
Casalaina et al., "BMRC Procedures: RealMedia Guide", doi: http://web.archive.org/web/20030218131051/http://bmrc.berkeley.edu/info/procedures/rm.html.*
Barbara, et al.; "The Audio Web"; Proc. 6th Int. Conf. on Information and Knowledge Management; Jan. 1997; XP002352519; Las Vegas; USA; pp. 97-104.
Office Action Dated Jun. 11, 2009 in U.S. Appl. No. 11/352,710.
Office Action Dated May 19, 2009 in U.S. Appl. No. 11/352,727.
Final Office Action Dated Apr. 20, 2009 in U.S. Appl. No. 11/266,559.
Final Office Action Dated Oct. 30, 2008 in U.S. Appl. No. 11/266,662.
Final Office Action Dated Apr. 6, 2009 in U.S. Appl. No. 11/266,675.
Final Office Action Dated Dec. 19, 2008 in U.S. Appl. No. 11/266,698.
Office Action Dated May 14, 2009 in U.S. Appl. No. 11/352,709.
Final Office Action Dated Apr. 29, 2008 in U.S. Appl. No. 11/207,911.
Final Office Action Dated Apr. 15, 2009 in U.S. Appl. No. 11/207,911.
Final Office Action Dated Sep. 25, 2008 in U.S. Appl. No. 11/226,747.
Final Office Action Dated May 7, 2008 in U.S. Appl. No. 11/226,744.
Final Office Action Dated May 7, 2008 in U.S. Appl. No. 11/207,912.
Final Office Action Dated Apr. 28, 2009 in U.S. Appl. No. 11/207,912.
Final Office Action Dated Sep. 16, 2008 in U.S. Appl. No. 11/266,663.
Final Office Action Dated Mar. 30, 2009 in U.S. Appl. No. 11/331,694.
Final Office Action Dated Feb. 9, 2009 in U.S. Appl. No. 11/331,692.
Final Office Action Dated May 7, 2008 in U.S. Appl. No. 11/207,914.
Final Office Action Dated Apr. 14, 2009 in U.S. Appl. No. 11/207,914.
Final Office Action Dated Dec. 23, 2008 in U.S. Appl. No. 11/207,913.
Final Office Action Dated Sep. 15, 2008 in U.S. Appl. No. 11/226,746.
U.S. Appl. No. 11/619,236 Final Office Action mailed Oct. 22, 2010.
U.S. Appl. No. 12/178,448 Office Action mailed Apr. 2, 2010.
U.S. Appl. No. 12/178,448 Final Office Action mailed Sep. 14, 2010.
Office Action Dated Jan. 25, 2010 in U.S. Appl. No. 11/207,912.
Notice of Allowance Dated Feb. 3, 2010 in U.S. Appl. No. 11/207,911.
Final Office Action Dated Jul. 31, 2009 in U.S. Appl. No. 11/226,746.
Office Action Dated Jan. 25, 2010 in U.S. Appl. No. 11/226,746.
Final Office Action Dated Nov. 5, 2009 in U.S. Appl. No. 11/352,709.
Braun N. & Doner R.; "Using Sonic Hyperlinks in Web-TV"; International Conf. on Auditory Displays (ICAD '98), Nov. 1, 1998; XP 002428659; Glasgow, UK; Final Office Action Dated Nov. 5, 2009 in U.S. Appl. No. 11/352,746 Reference Not Provided.
Hoschka, et al.; "Synchronized Multimedia Integration Language (SMIL) 1.0 Specification"; Apr. 9, 1998; doi: http://www.w3.org/TR/1998/PR-smil-19980409/#anchor.
Casalaina, et al.; "BMRC Procedures: RealMedia Guide"; doi: http://web.archive.org/web/20030218131051/http://bmrc.berkeley.edu/info/procedures/rm.html.
Office Action Dated Apr. 29, 2009 in U.S. Appl. No. 11/352,698.
Office Action Dated Aug. 17, 2009 in U.S. Appl. No. 11/331,692.
Monahan et al.; "Adapting Multimedia Internet Content for Universal Access"; IEEE Transactions on Multimedia, vol. 1, No. 1; pp. 104-114; Mar. 1999.
Buchanan et al.; "Representing Aggregated Works in the Digital Library", University College London; London; pp. 247-256; Jun. 18, 2007.
Advertisement of TextToSpeechMP3.com; "Text to Speech MP3 with Natural Voices 1.71"; (author unknown); ZDNet.co.uk, London; from website http://downloadsszdnet.co.uk/0,1000000375,39148337s,00.htm; pp. 1-5; Oct. 5, 2004.
Andrade et al.; "Managing Multimedia Content and Delivering Services Across Multiple Client Platforms using XML"; Symposium; London Communications; London; pp. 1-8; Sep. 2002.
International Business Machines Corporation; PCT Search Report; Mar. 27, 2007; Application No. PCT/EP2007/050594.
U.S. Appl. No. 11/352,680 Office Action mailed Jun. 23, 2006.
U.S. Appl. No. 11/372,317 Office Action mailed Jul. 8, 2009.
U.S. Appl. No. 11/536,733 Final Office Action mailed Jul. 22, 2009.
U.S. Appl. No. 11/420,017 Office Action mailed Jul. 9, 2009.
U.S. Appl. No. 11/536,781 Office Action mailed Jul. 17, 2009.
U.S. Appl. No. 11/420,014 Office Action mailed Jul. 23, 2009.
U.S. Appl. No. 11/420,018 Final Office Action mailed Jul. 21, 2009.
U.S. Appl. No. 11/352,760 Office Action mailed Apr. 15, 2009.
U.S. Appl. No. 11/352,760 Final Office Action mailed Nov. 16, 2009.
U.S. Appl. No. 11/352,824 Notice of Allownace mailed Jun. 5, 2008.
U.S. Appl. No. 11/352,824 Office Action mailed Jan. 22, 2008.
U.S. Appl. No. 11/352,680 Final Office Action mailed Dec. 21, 2009.
U.S. Appl. No. 11/352,679 Office Action mailed Apr. 30, 2009.
U.S. Appl. No. 11/352,679 Final Office Action mailed Oct. 29, 2009.
U.S. Appl. No. 11/372,323 Office Action mailed Oct. 28, 2008.
U.S. Appl. No. 11/372,318 Office Action mailed Mar. 18, 2008.
U.S. Appl. No. 11/372,318 Final Office Action mailed Jul. 9, 2008.

(56) References Cited

OTHER PUBLICATIONS

U.S. Appl. No. 11/372,329 Final Office Action mailed Nov. 6, 2009.
U.S. Appl. No. 11/372,325 Office Action mailed Feb. 25, 2009.
U.S. Appl. No. 11/372,329 Office Action mailed Feb. 27, 2009.
U.S. Appl. No. 11/536,781 Final Office Action mailed Jan. 15, 2010.
U.S. Appl. No. 11/420,015 Office Action mailed Mar. 20, 2008.
U.S. Appl. No. 11/420,015 Final Office Action mailed Sep. 3, 2008.
U.S. Appl. No. 11/420,015 Office Action mailed Dec. 2, 2008.
U.S. Appl. No. 11/420,016 Office Action mailed Mar. 3, 2008.
U.S. Appl. No. 11/420,016 Final Office Action mailed Aug. 29, 2008.
U.S. Appl. No. 11/420,017 Final Office Action mailed Dec. 31, 2009.
U.S. Appl. No. 11/420,018 Office Action mailed Mar. 21, 2008.
U.S. Appl. No. 11/420,018 Final Office Action mailed Aug. 29, 2008.
U.S. Appl. No. 11/420,018 Office Action mailed Dec. 3, 2008.
U.S. Appl. No. 11/536,733 Office Action mailed Dec. 30, 2008.
U.S. Appl. No. 11/619,216 Office Action mailed Jan. 26, 2010.
U.S. Appl. No. 11/619,253 Office Action mailed Apr. 2, 2009.
U.S. Appl. No. 11/352,760 Office Action mailed Sep. 16, 2010.
U.S. Appl. No. 11/352,680 Office Action mailed Jun. 10, 2010.
U.S. Appl. No. 11/352,680 Final Office Action mailed Sep. 7, 2010.
U.S. Appl. No. 11/352,679 Office Action mailed May 28, 2010.
U.S. Appl. No. 11/352,679 Final Office Action mailed Nov. 15, 2010.
U.S. Appl. No. 11/372,317 Office Action mailed Sep. 23, 2010.
U.S. Appl. No. 11/372,319 Office Action mailed Apr. 21, 2010.
U.S. Appl. No. 11/372,319 Final Office Action mailed Jul. 2, 2010.
U.S. Appl. No. 11/420,014 Final Office Action mailed Apr. 3, 2010.
U.S. Appl. No. 11/420,017 Final Office Action mailed Sep. 23, 2010.
U.S. Appl. No. 11/619,216 Final Office Action mailed Jun. 25, 2010.
Mohan et al. "Adapting Multimedia Internet Content for Universal Access." IBM T.J Watson Research Center, pp. 1-35.
Lu et al., "Audio Ticker". WWW7 / Computer Networks 30(1-7): 721-722 (1998).
http://webarchive.org/web/20031203063919/http://eastbaytech.com/im.htm.
http://www.odiogo.com.
FeedForAll at http://web.archive.org/web/20050813012521/http://www.feedforall.com/itune-tutorial-tags.htm.
Internet Archive for FeedForAll at http://web.archive.org/web/*/http://www.feedforall.com/itune-tuntorial-tags.htm.
Audioblog at http://web.archive.org/web/20040923235033.
Zhang, Liang-Jie, et al., "XML-Based Advanced UDDI Search Mechanism for B2B Integration", Electronic Commerce Research, vol. 3, Nos. 1-2, Jan. 2003, pp. 24-42.
He, Tian, et al., "AIDA: Adaptive Application-Independent Data Aggregation in Wireless Sensor Networks", TECS, vol. 3, Issue 2, May 2004, pp. 426-457.
Braun N. Doner R: "Using Sonic Hyperlinks in Web-TV," International Conf on Auditory Displays (ICAD '98), Nov. 1, 1998, XPOO2428659, Glasgow, UK.
Braun N et al: "Temporal hypermedia for multimedia applications in the World Wide Web," Computational Intelligence and Multimedia Applications, 1999. ICCIMA '99. Third International Conference on New Delhi, India, Sep. 23-23, 1999. Los Alamitos, CA USE, IEEE Comput. SAC, US, Sep. 23, 1999, XP010355646 ISBN: 0-7695-0300-4.
Frankie James: "AHA: audio HTML access" Computer Networks and ISDN Systems, vol. 209, No. 8-13, Sep. 1997, pp. 1395-1404, XP002430654.
PCT Search Report, Sep. 2, 2007; PCT Application No. PCT/EP2007/051260.
Braun N. Doner R: "Using Sonic Hyperlinks in Web-TV", International Conf. on Auditory Displays (ICAD '98), Nov. 1, 1998, XP002428659, Glasgow, UK.
Braun N et al: "Temporal hypermedia for multimedia applications in the World Wide Web", Computational Intelligence and Multimedia Applications, 1999. ICCIMA '99. Third International Conference on New Delhi, India, Sep. 23-23, 1999. Los Alamitos, CA USE, IEEE Comput. SOC, US, Sep. 23, 1999. XP010355646 ISBN; 0-7695-0300-4.

\* cited by examiner

INVOKING AN AUDIO HYPERLINK

BACKGROUND OF THE INVENTION

1. Field of the Invention

The field of the invention is data processing, or, more specifically, methods, systems, and products for invoking an audio hyperlink.

2. Description of Related Art

A 'hyperlink' is a reference to a URI which when invoked requests access to a resource identified by a URI. The term 'hyperlink' often includes links to URIs effected through conventional markup elements for visual display, as well as 'Back' and 'Forward' buttons on a toolbar in a GUI of a software application program. Users are typically made aware of hyperlinks by displaying text associated with the hyperlink or the URI itself in highlighting, underscoring, specially coloring, or some other fashion setting the hyperlink apart from other screen text and identifying it as an available hyperlink. In addition, the screen display area of the anchor is often sensitized to user interface operations such as GUI pointer operations such as mouse clicks. Such conventional hyperlinks require a visual screen display to make a user aware of the hyperlink and a device for GUI pointer operations to invoke the hyperlink. Audio files however are typically played on devices with no visual display and without devices for GUI pointer operations.

SUMMARY OF THE INVENTION

Methods, systems, and computer program products are provided for invoking an audio hyperlink. Embodiments include identifying a predetermined playback time in an audio file pre-designated as having an associated audio hyperlink; playing an audio indication of the audio hyperlink at the predetermined playback time; receiving from a user an instruction to invoke the audio hyperlink; identifying a URI associated with the audio hyperlink; and invoking the URI. The audio file may include an audio subcomponent of a file also including video.

Identifying a predetermined playback time in an audio file pre-designated as having an associated audio hyperlink may be carried out by retrieving from an audio hyperlink data structure a playback time in the audio file pre-designated as having an audio hyperlink. Playing an audio indication of the audio hyperlink may be carried out by retrieving from an audio hyperlink data structure an audio indication ID identifying an audio indication of the audio hyperlink and augmenting the sound of the audio file in accordance with the audio indication ID.

Receiving from a user an instruction to invoke the audio hyperlink may be carried out by receiving speech from a user; converting the speech to text; and comparing the text to a grammar. Identifying a URI associated with the audio hyperlink may be carried out by retrieving from a data structure a URI in dependence upon a user speech instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
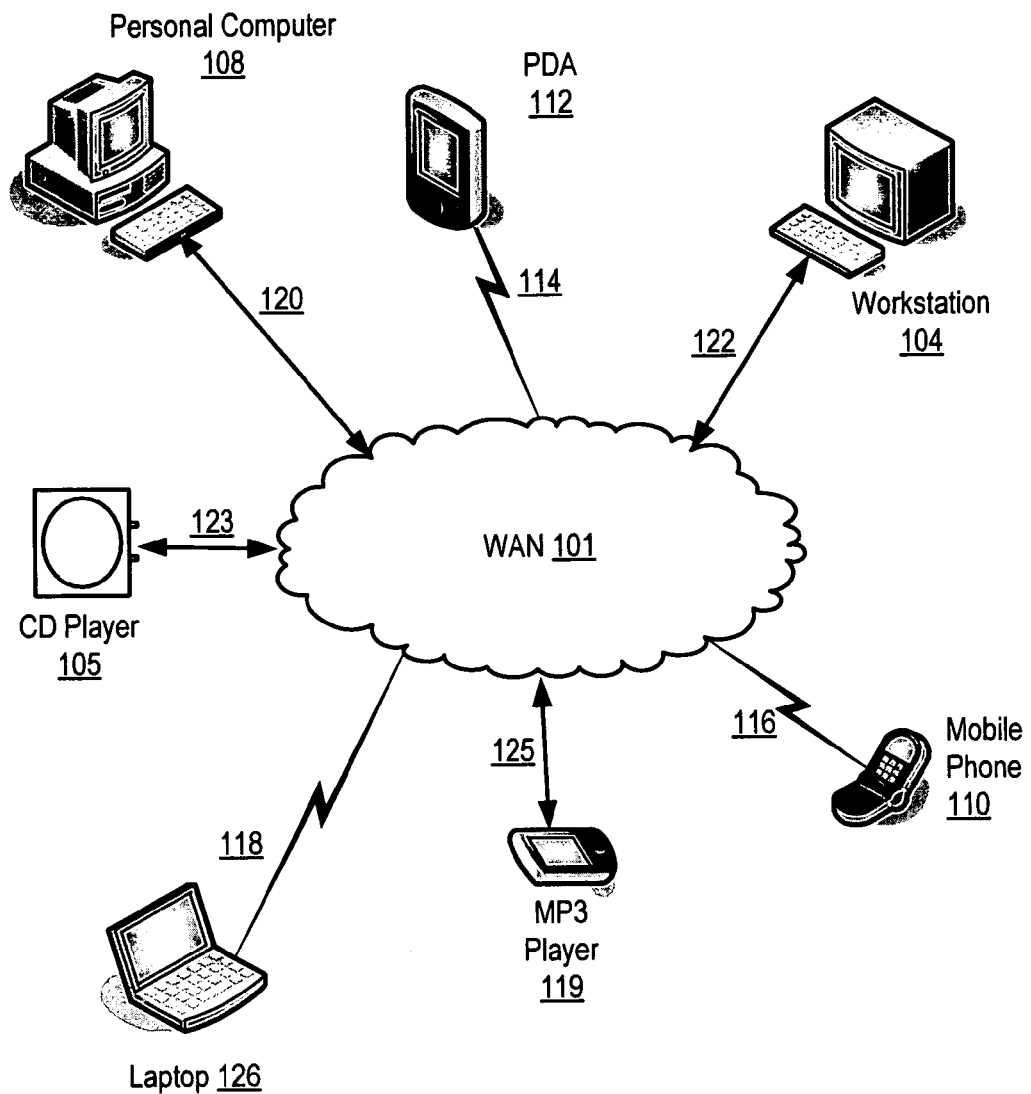
FIG. 1 sets forth a network diagram illustrating an exemplary system of computers each of which is capable of invoking an audio hyperlink according to the present invention and for annotating an audio file with an audio hyperlink according to the present invention.

Exemplary methods, systems, and products for invoking an audio hyperlink and for annotating an audio file with an audio hyperlink according to embodiments of the present invention are described with reference to the accompanying drawings, beginning with FIG. 1. FIG. 1 sets forth a network diagram illustrating an exemplary system of computers each of which is capable of invoking an audio hyperlink according to the present invention and for annotating an audio file with an audio hyperlink according to the present invention. In the example of FIG. 1 a personal computer (108) is connected to a wide are network ('WAN') (101) though a wireline connection (120). A PDA (112) connects to the WAN (101) through a wireless connection (114). A workstation (104) connects to the WAN (101) through a wireline connection (122). A mobile phone (110) connects to the WAN (101) through a wireless connection (116). An MP3 audio file player (119) connects to the WAN (101) through a wireline connection (125). A laptop (126) connects to the WAN (101) through a wireless connection (118). A compact disc player (105) connects to the WAN (101) through a wireline connection (123).

Each of the computers (108, 112, 104, 110, 119, 126, 105) of FIG. 1 is capable of playing an audio file and is capable of supporting an audio file player according the present invention that is capable supporting an audio hyperlink module computer program instructions for invoking an audio hyperlink. Such an audio hyperlink module is generally capable of identifying a predetermined playback time in an audio file pre-designated as having an associated audio hyperlink; playing an audio indication of the audio hyperlink at the predetermined playback time; receiving from a user an instruction to invoke the audio hyperlink; identifying a URI associated with the audio hyperlink; and invoking the URI.

An 'audio hyperlink' is a reference to a URI which when invoked requests access to a resource identified by the URI and whose existence is identified to users through an audio indication of the audio hyperlink. Audio hyperlinks according to the present invention are typically invoked through speech by a user, although audio hyperlinks may also be invoked by user through an input device such as a keyboard, mouse or other device as will occur to those of skill in the art.

A "URI" or "Uniform Resource Identifier" is an identifier of an object. Such an object may be in any namespace accessible through a network, a file accessible by invoking a filename, or any other object as will occur to those of skill in the art. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a web page, a CGI script, or a servlet, is located on a network, usually the Internet. URIs directed to particular resources, such as particular HTML files, JPEG files, or MPEG files, typically include a path name or file name locating and identifying a particular resource in a file system coupled to a network. To the extent that a particular resource, such as a CGI file or a servlet, is executable, for example to store or retrieve data, a URI often includes query parameters, or data to be stored, in the form of data encoded into the URI. Such parameters or data to be stored are referred to as 'URI encoded data.'

Each of the computers (108, 112, 104, 110, 119, 126, 105) of FIG. 1 is capable of supporting an audio file annotation tool comprising computer program instructions for annotating an audio file with an audio hyperlink. Such an audio file annotation tool is generally capable of receiving an identification of a playback time in an audio file to associate with an audio hyperlink; receiving a selection of a URI identifying a resource to be accessed upon the invocation of the audio hyperlink; receiving a selection of one or more keywords for invoking the audio hyperlink; and associating with the playback time in the audio file the URI, and the one or more keywords.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
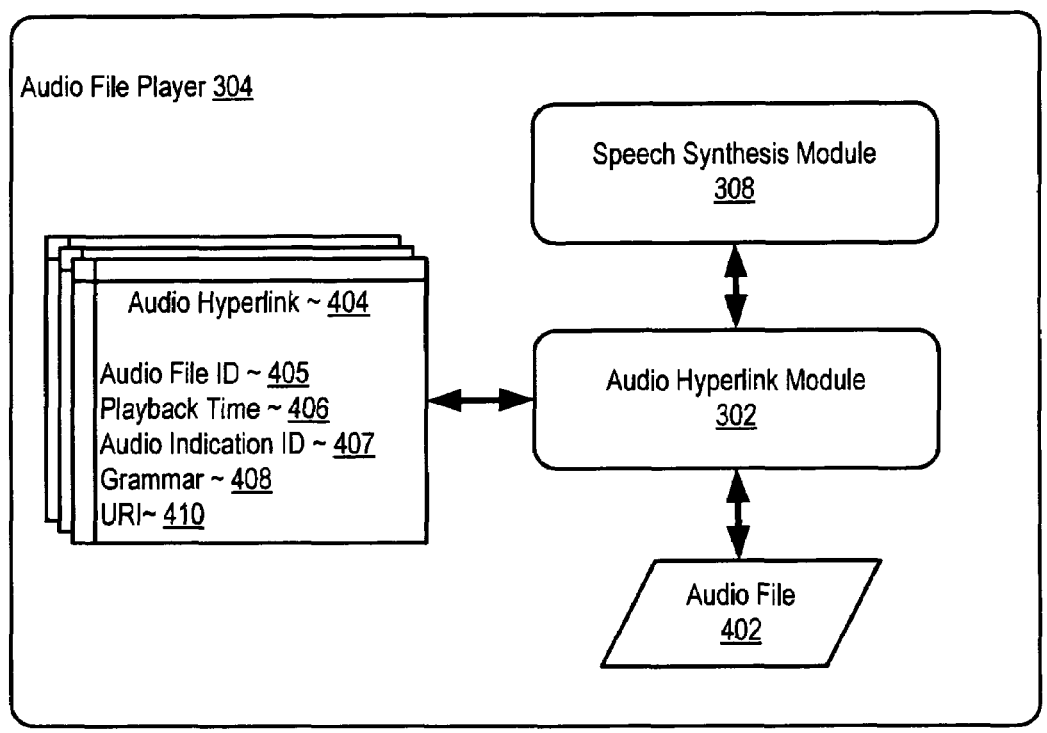
FIG. 2 sets forth a line drawing of an exemplary audio file player capable of invoking an audio hyperlink according to the present invention.

For further explanation, FIG. 2 sets forth a line drawing of an exemplary audio file player (304) capable of invoking an audio hyperlink according to the present invention. An 'audio hyperlink' is a reference to a URI which when invoked requests access to a resource identified by the URI and whose existence is identified to users through an audio indication of the audio hyperlink. Audio hyperlinks according to the present invention are typically invoked through speech by a user, although audio hyperlinks may also be invoked by user through an input device such as a keyboard, mouse or other device as will occur to those of skill in the art.

The audio file player (304) of FIG. 2 also includes a speech synthesis module (308), computer program instructions capable of receiving speech from a user, converting the speech to text, and comparing the text to a grammar to receive an instruction as speech from a user to invoke the audio hyperlink. Examples of speech synthesis modules useful in invoking audio hyperlinks according to the present invention include IBM's ViaVoice Text-to-Speech, Acapela Multimedia TTS, AT&T Natural Voices™ Text-to-Speech Engine, and other speech synthesis modules as will occur to those of skill in the art.

The audio file player (304) of FIG. 2 includes an audio hyperlink module, computer program instructions for identifying a predetermined playback time in an audio file (402) pre-designated as having an associated audio hyperlink, playing an audio indication of the audio hyperlink at the predetermined playback time; receiving from a user an instruction to invoke the audio hyperlink; identifying a URI associated with the audio hyperlink; and invoking the URI.

Audio files useful in invoking audio hyperlinks and capable of being annotated with audio hyperlinks according to the present invention include audio files, as well as audio subcomponents of a file also including video. Examples of audio files useful with the present invention include wave files '.wav', MPEG layer-3 files ('.mp3') and others as will occur to those of skill in the art.

The audio hyperlink in the example of FIG. 2 is implemented as a data structure (404) made available to the audio hyperlink module (302) in an audio file player (304). The audio hyperlink data structure (404) of FIG. 2 includes an audio file ID (405) uniquely identifying the audio file having an associated audio hyperlink. The audio hyperlink data structure (404) of FIG. 2 also includes a playback time (406) identifying a playback time in the audio file having an associated audio hyperlink.

The audio hyperlink data structure (404) of FIG. 2 includes an audio indication ID (407) uniquely identifying the audio indication for the audio hyperlink. An audio indication is a predetermined sound for augmenting the playback of the audio file that is designed to make a user aware of the existence of the audio hyperlink. Audio indications may be predetermined earcons designed to inform users of the existence of audio hyperlinks, pitch-shifts or phase-shifts during the playback of the audio file designed to inform users of the existence of audio hyperlinks or any other audio indication that will occur to those of skill in the art. An audio player supporting more than one type of audio indication of audio hyperlinks in audio files may be informed of one of a plurality of supported audio indications through the use of an audio indication ID (407) in an audio hyperlink data structure (404) as in the example of FIG. 2.

The audio hyperlink data structure (404) of FIG. 2 includes a grammar (408). A grammar is a collection of one or more keywords that are recognized by an audio player supporting audio files with audio hyperlinks that when received trigger the invocation of URI for the audio hyperlink. The audio hyperlink data structure (404) of FIG. 2 also includes a URI (410) identifying a resource referenced by the audio hyperlink. The URI identifies a resource accessed by invoking the audio hyperlink.

Invoking an audio hyperlink and annotating an audio file with an audio hyperlink in accordance with the present invention is generally implemented with computers, that is, with automated computing machinery. In the system of FIG. 1, for example, all the nodes, servers, and communications devices are implemented to some extent as computers. For further explanation, therefore, FIG. 3 sets forth a block diagram of automated computing machinery comprising an exemplary computer (152) useful in both invoking an audio hyperlink according to the present invention and annotating an audio file with an audio hyperlink according to the present invention. The computer (152) of FIG. 3 includes at least one computer processor (156) or 'CPU' as well as random access memory (168) ('RAM') which is connected through a system bus (160) to processor (156) and to other components of the computer. Stored in RAM (168) is an audio file player (304) including an audio hyperlink module (302), computer program instructions for invoking an audio hyperlink that are capable of identifying a predetermined playback time in an audio file pre-designated as having an associated audio hyperlink; playing an audio indication of the audio hyperlink at the predetermined playback time; receiving from a user an instruction to invoke the audio hyperlink; identifying a URI associated with the audio hyperlink; and invoking the URI.

Figure 3:
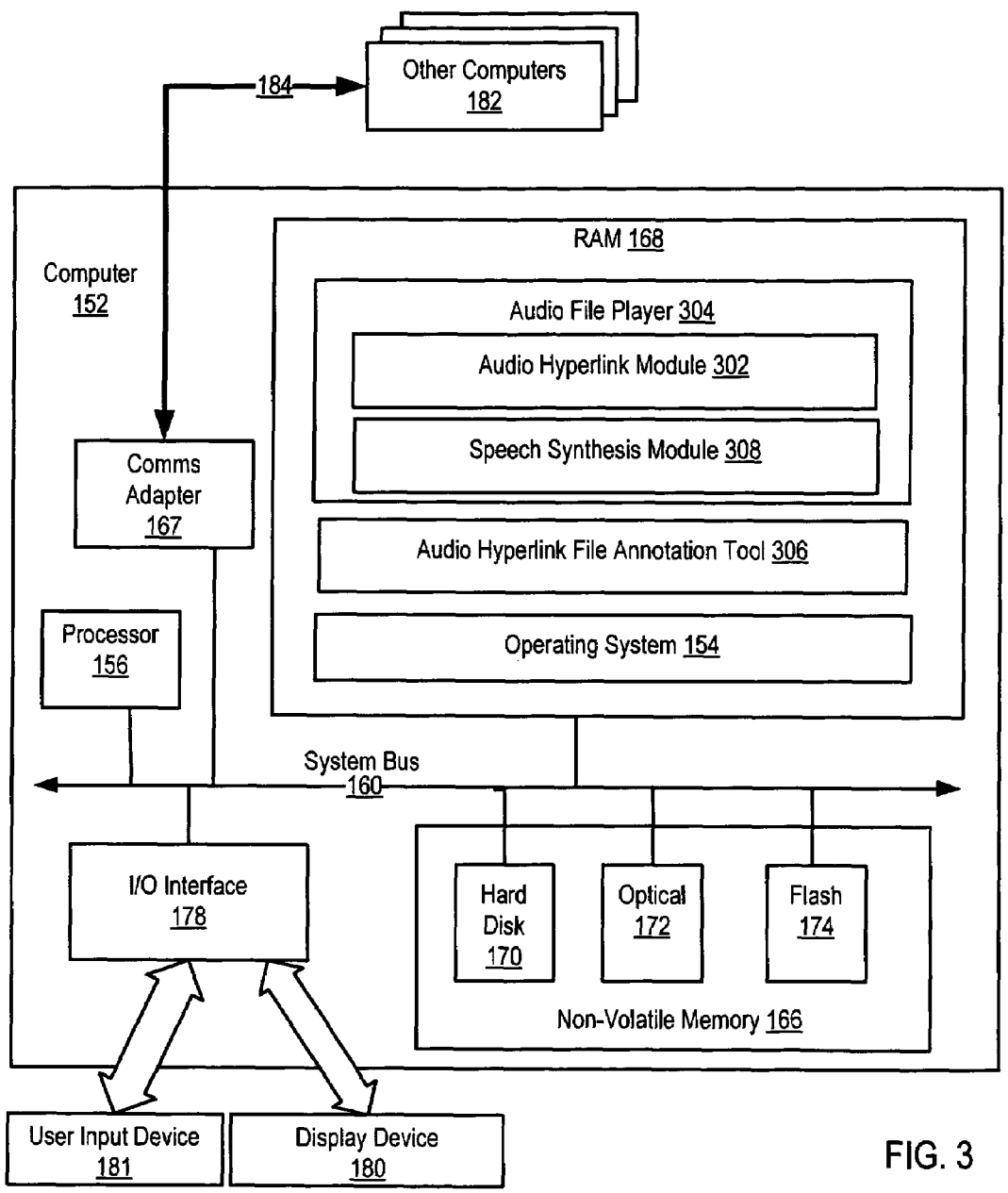
FIG. 3 sets forth a block diagram of automated computing machinery comprising an exemplary computer useful in both invoking an audio hyperlink according to the present invention and annotating an audio file with an audio hyperlink according to the present invention.

The audio file player (304) of FIG. 3 also includes a speech synthesis module (308), computer program instructions capable of receiving speech from a user, converting the speech to text, and comparing the text to a grammar to receive an instruction as speech from a user to invoke the audio hyperlink. Examples of speech synthesis modules useful in invoking audio hyperlinks according to the present invention include IBM's ViaVoice Text-to-Speech, Acapela Multimedia TTS, AT&T Natural Voices™ Text-to-Speech Engine, and other speech synthesis modules as will occur to those of skill in the art.

Also stored RAM (168) is an audio hyperlink file annotation tool (306) computer program instructions for annotating an audio file with an audio hyperlink that are capable of receiving an identification of a playback time in an audio file to associate with an audio hyperlink; receiving a selection of a Uniform Resource identifier ('URI') identifying a resource to be accessed upon the invocation of the audio hyperlink; receiving a selection of one or more keywords for invoking the audio hyperlink; and associating with the playback time in the audio file the URI, and the one or more keywords. Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154), audio file player (304), audio hyperlink module (302), speech synthesis module (308) and audio hyperlink annotation tool (306) in the example of FIG. 3 are shown in RAM (168), but many components of such software typically are stored in non-volatile memory (166) also.

Computer (152) of FIG. 3 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 3 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 4:
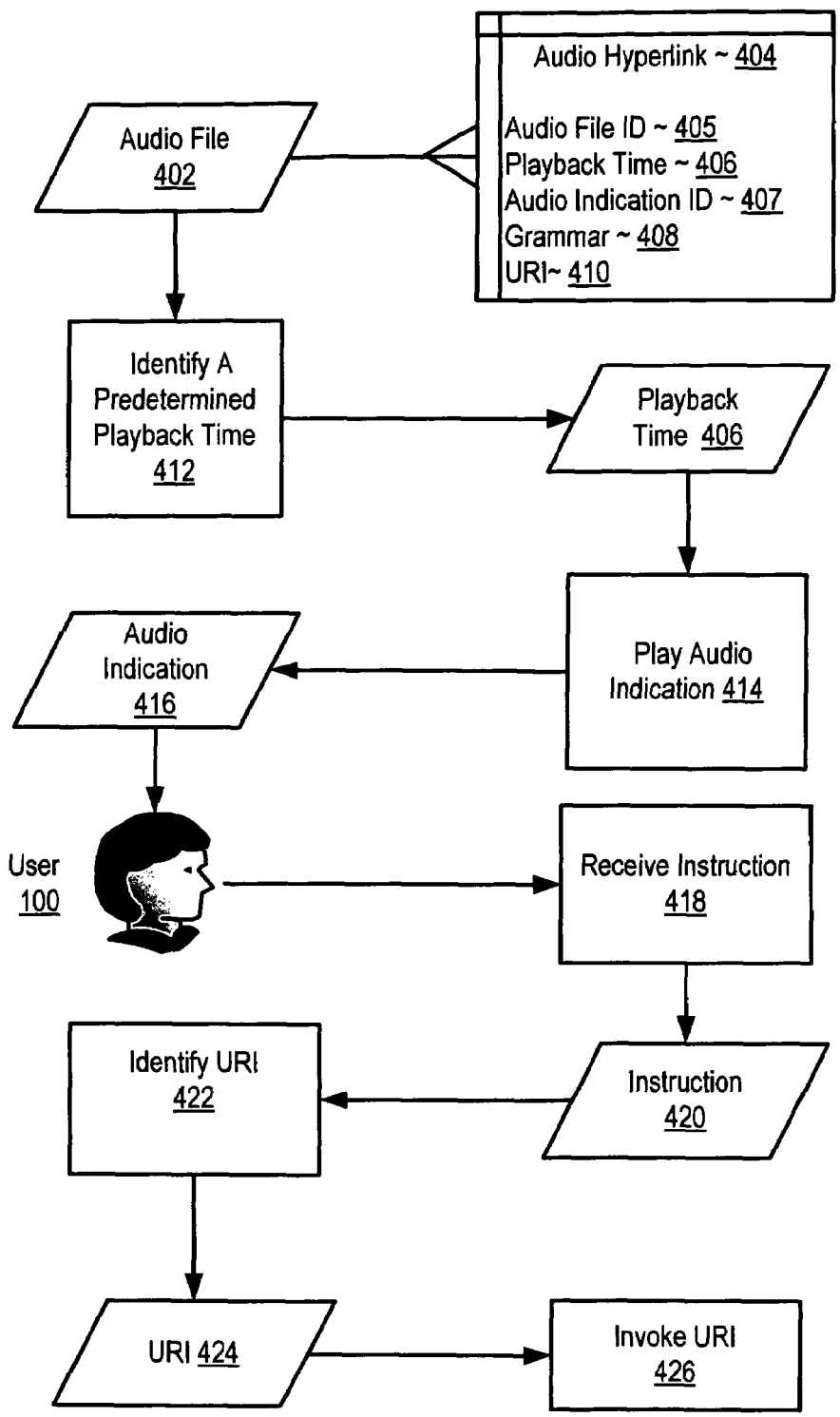
FIG. 4 sets forth a flow chart illustrating an exemplary method for invoking an audio hyperlink.

For further explanation, FIG. 4 sets forth a flow chart illustrating an exemplary method for invoking an audio hyperlink. As discussed above, an 'audio hyperlink' is a reference to a URI which when invoked requests access to a resource identified by the URI and whose existence is identified to users through an audio indication of the audio hyperlink. Audio hyperlinks according to the present invention are typically invoked through speech by a user, although audio hyperlinks may also be invoked by user through an input device such as a keyboard, mouse or other device as will occur to those of skill in the art. Audio files useful in invoking audio hyperlinks and being capable of being annotated with audio hyperlinks according to the present invention include audio files, as well as audio subcomponents of a file also including video.

The audio hyperlink in the example of FIG. 4 is implemented as a data structure (404) made available to an audio hyperlink module in an audio file player. The audio hyperlink data structure (404) of FIG. 4 includes an audio file ID (405) uniquely identifying the audio file having an associated audio hyperlink. The audio hyperlink data structure (404) of FIG. 4 also includes a playback time (406) identifying a playback time in the audio file having an associated audio hyperlink.

The audio hyperlink data structure (404) of FIG. 4 includes an audio indication ID (407) uniquely identifying the audio indication for the audio hyperlink. An audio indication is a predetermined sound for augmenting the playback of the audio file that is designed to make a user aware of the existence of the audio hyperlink. Audio indications may be predetermined earcons designed to inform users of the existence of audio hyperlinks, pitch-shifts or phase-shifts during the playback of the audio file designed to inform users of the existence of audio hyperlinks or any other audio indication that will occur to those of skill in the art. An audio player supporting more than one type of audio indication of audio hyperlinks in audio files may be informed of one of a plurality of supported audio indications through the use of an audio indication ID (407) in an audio hyperlink data structure (404) as in the example of FIG. 4.

The audio hyperlink data structure (404) of FIG. 4 includes a grammar (408). A grammar is a collection of one or more keywords that are recognized by an audio player supporting audio files with audio hyperlinks that when received trigger the invocation of URI (410) for the audio hyperlink. The audio hyperlink data structure (404) of FIG. 4 also includes a URI identifying a resource referenced by the audio hyperlink. The URI identifies a resource accessed by invoking the audio hyperlink.

The method of FIG. 4 includes identifying (412) a predetermined playback time (406) in an audio file (402) pre-designated as having an associated audio hyperlink (404). Identifying (412) a predetermined playback time (406) in an audio file (402) pre-designated as having an associated audio hyperlink may be carried out by retrieving from an audio hyperlink data structure (404) a playback time (406) in the audio file (402) pre-designated as having an audio hyperlink (404).

The playback time (406) may be targeted to the playback of a single word, phrase, or sound that is conceptually related to the subject of the audio file. Consider for further explanation, an audio file of an advertisement for a clothing store. The playback time of the audio file corresponding with the word "pants" may be associated with an audio hyperlink to a pants manufacturer. Playing an audio indication of the existence of the audio hyperlink informs a user of the existence of the audio hyperlink allowing a user to invoke a user to the pants manufacturer though speech invocation of the URI if a user so desires.

The method of FIG. 4 also includes playing (414) an audio indication (416) of the audio hyperlink (404) at the predetermined playback time (406). Playing (414) an audio indication (416) of the audio hyperlink (404) at the predetermined playback time (406) may be carried out by playing an earcon designed to inform a user of the existence of the audio hyperlink, by pitch-shifting the playback of the audio file at the playback time having the associated audio hyperlink, by phase-shifting the playback of the audio file at the playback time having the associated audio hyperlink or any other way of playing an audio indication of an audio hyperlink that will occur to those of skill in the art.

The method of FIG. 4 also includes receiving (418) from a user (100) an instruction (420) to invoke the audio hyperlink (404). Receiving (418) from a user (100) an instruction (420) to invoke the audio hyperlink (404) may be carried out by receiving speech from a user (100); converting the speech to text; and comparing the text to a grammar (408) as discussed below with reference to FIG. 6.). Receiving (418) from a user (100) an instruction (420) to invoke the audio hyperlink (404) may be carried out by receiving an instruction through a user input device such as a keyboard, mouse, GUI input widget or other device as will occur to those of skill in the art.

The method of FIG. 4 also includes identifying (422) a URI (424) associated with the audio hyperlink (404) and invoking (426) the URI (424). Identifying (422) a URI (424) associated with the audio hyperlink (404) may be carried out by retrieving from an audio hyperlink data structure a URI. Invoking (426) the URI (424) makes available the resource or resources referenced by the audio hyperlink.

Figure 5:
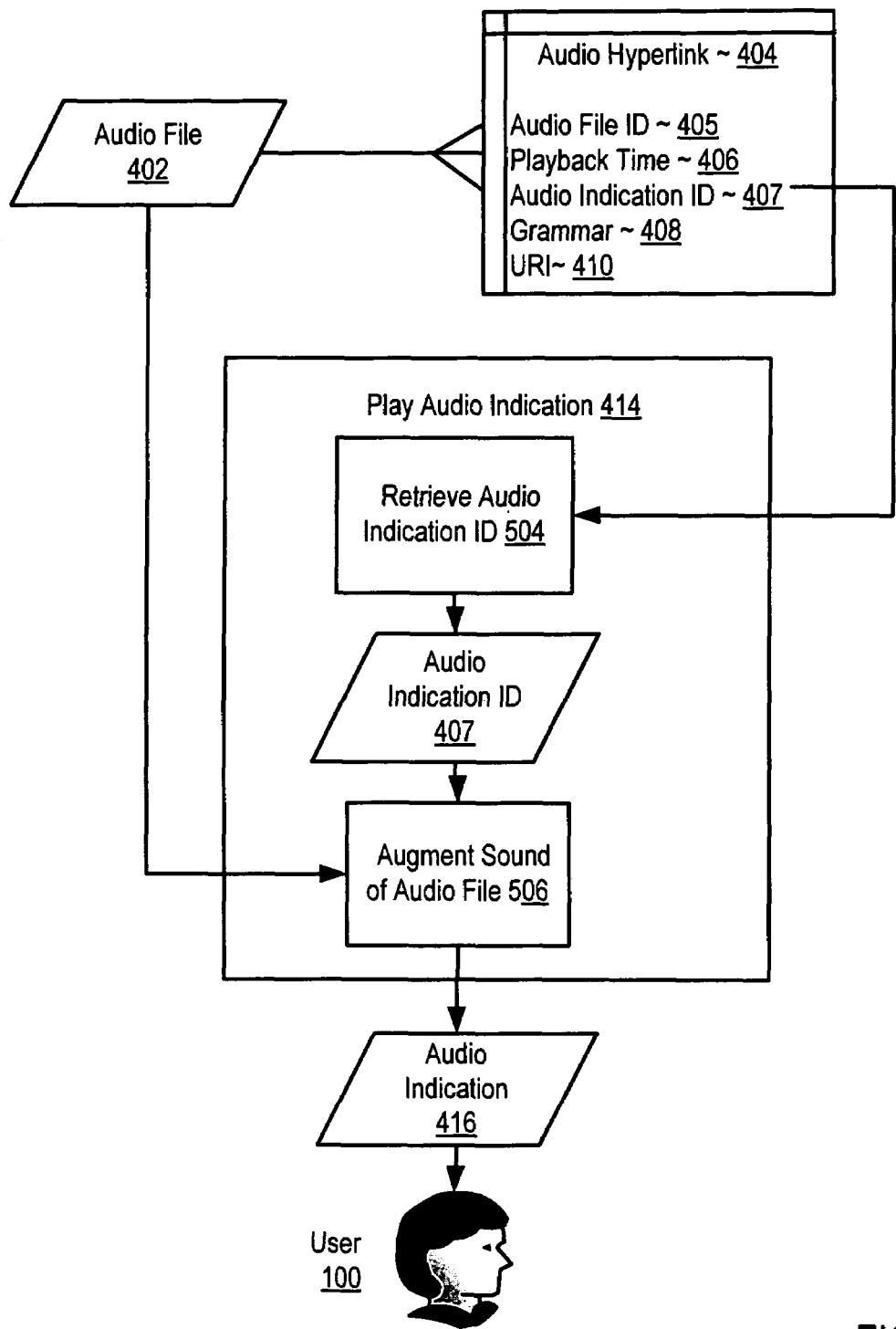
FIG. 5 sets forth a flow chart illustrating an exemplary method for playing an audio indication of an audio hyperlink.

As discussed above, audio file players may be capable of supporting more than one type of audio indication designed to inform a user of the existence of an audio hyperlink. For further explanation, FIG. 5 sets forth a flow chart illustrating an exemplary method for playing an audio indication of an audio hyperlink. In the method of FIG. 5, playing (414) an audio indication (416) of the audio hyperlink (404) includes retrieving (504) from an audio hyperlink data structure (404) an audio indication ID (407) identifying an audio indication of the audio hyperlink (404). An audio indication ID may identify a particular type of audio indication such as for example an earcon, an instruction to phase-shift or pitch-shift the playback of the audio file at the associated playback time or an audio indication ID may identify a particular audio indication of an audio hyperlink such as one of a plurality of supported earcons.

Playing (414) an audio indication (416) of the audio hyperlink (404) according to the method of FIG. 5 also includes augmenting (506) the sound of the audio file (402) in accordance with the audio indication ID (407). Augmenting (506) the sound of the audio file (402) in accordance with the audio indication ID (407) may be carried out by phase-shifting the playback of the audio file at the associated playback time, pitch-shifting the playback of the audio file at the associated playback time, or other ways of changing the normal playback of the audio file at the predetermined playback time.

Augmenting (506) the sound of the audio file (402) in accordance with the audio indication ID (407) may also be carried out by adding an earcon such as ring or other sound to the playback of the audio file.

As discussed above, audio hyperlinks are typically invoked by speech instructions from a user. For further explanation, therefore, FIG. 6 sets forth a flow chart illustrating an exemplary method for receiving from a user an instruction to invoke the audio hyperlink that includes receiving (508) speech (510) from a user (100) and converting (512) the speech (510) to text (514). Receiving (508) speech (510) from a user (100) and converting (512) the speech (510) to text (514) may be carried out by a speech synthesis engine in an audio file player supporting audio hyperlinking according to the present invention. Examples of such speech synthesis modules include, for example, IBM's ViaVoice Text-to-Speech, Acapela Multimedia TTS, AT&T Natural Voices™ Text-to-Speech Engine, and other speech synthesis modules as will occur to those of skill in the art.

Figure 6:
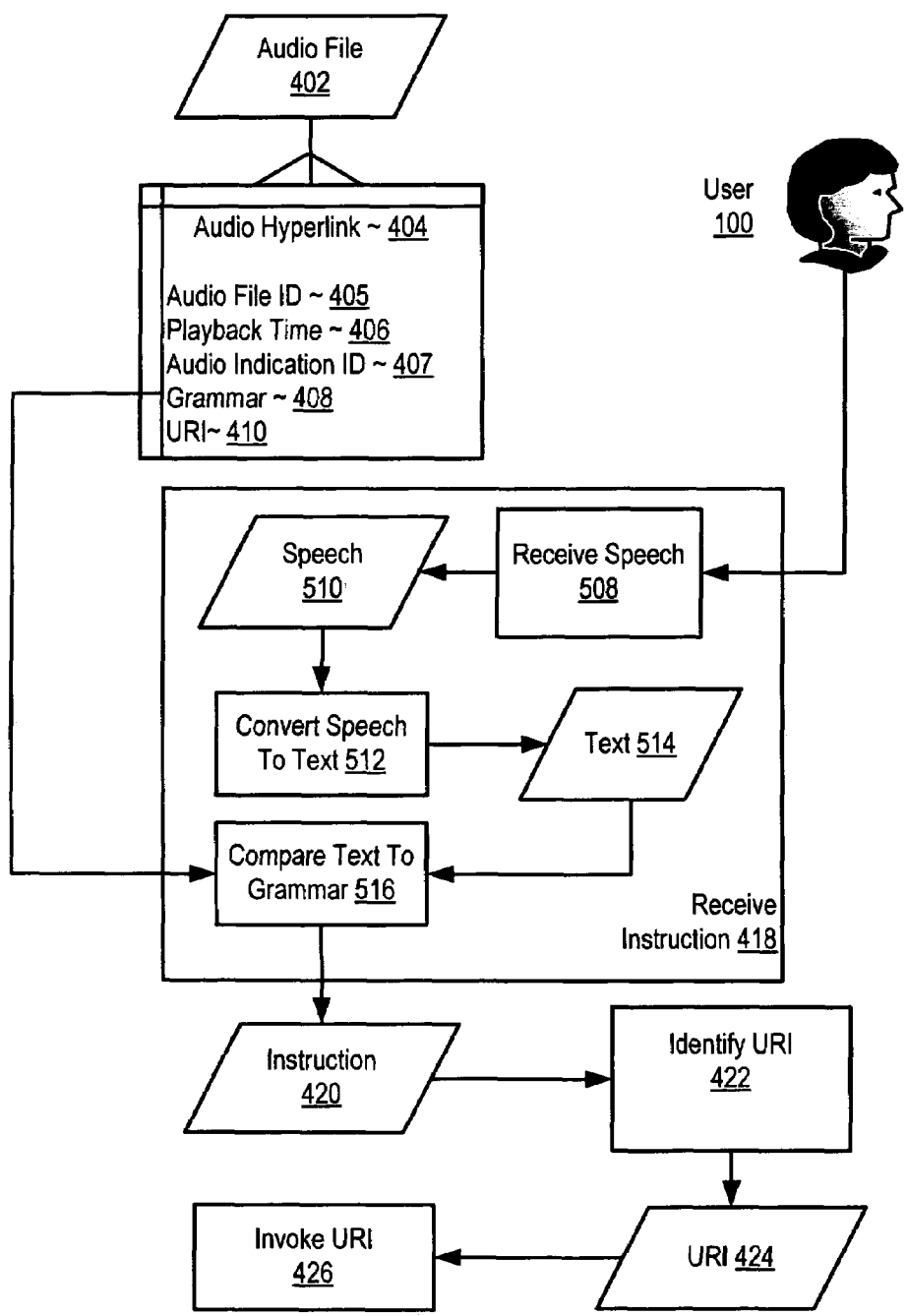
FIG. 6 sets forth a flow chart illustrating an exemplary method for receiving from a user an instruction to invoke the audio hyperlink.

The method of FIG. 6 also includes comparing (516) the text (514) to a grammar (408). As discussed above, a grammar is a collection of one or more keywords that are recognized by an audio player supporting audio files with audio hyperlinks that when received trigger the invocation of URI for the audio hyperlink. Text conversions of speech instructions matching keywords in the grammar are recognized as instructions to invoke the audio hyperlink.

Figure 7:
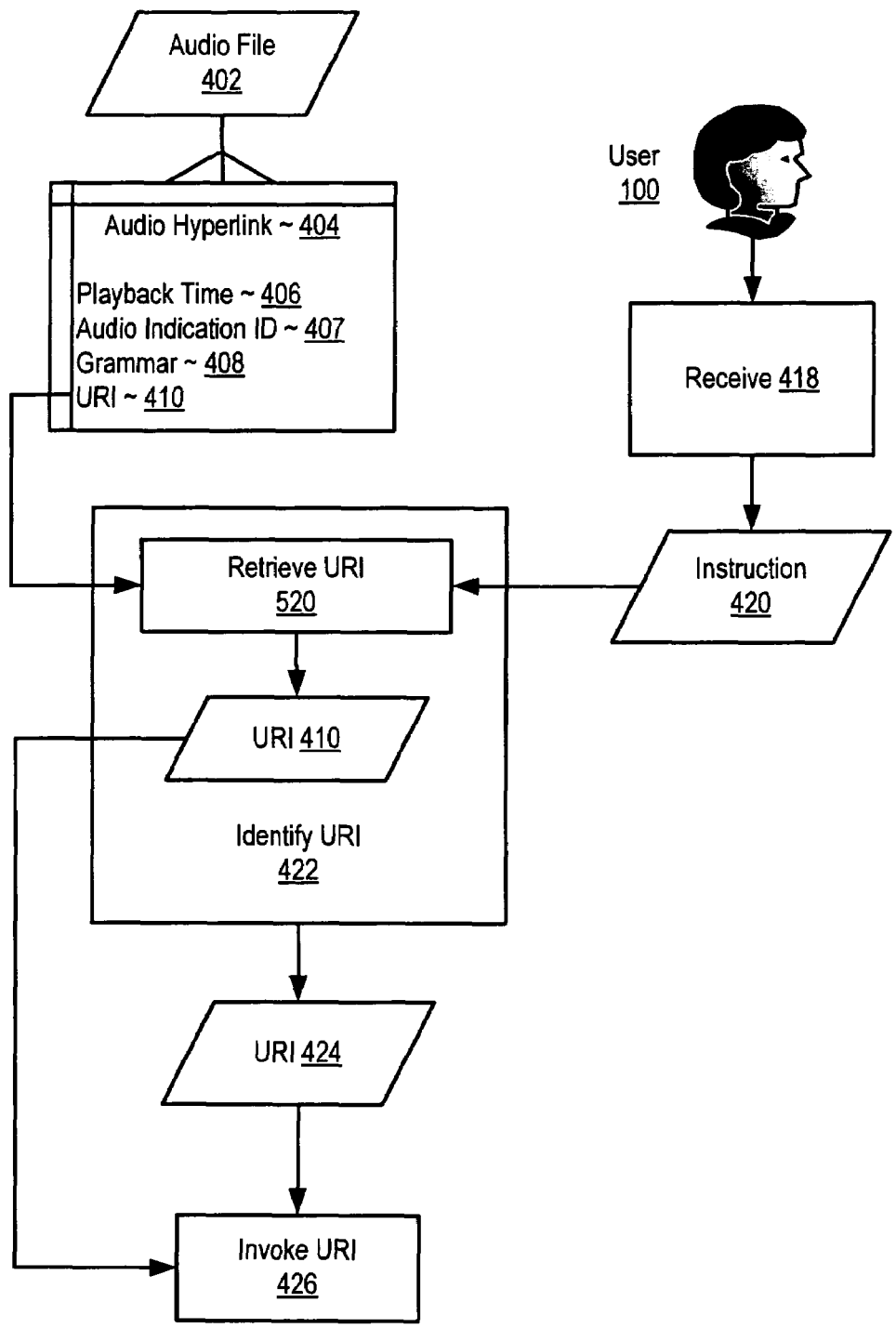
FIG. 7 sets forth a flow chart illustrating an exemplary method for identifying a URI associated with the audio hyperlink.

As discussed above, invoking an audio hyperlink is typically carried out by invoking a URI to access a resource referenced by the audio hyperlink. For further explanation, FIG. 7 sets forth a flow chart illustrating an exemplary method for identifying (422) a URI (424) associated with the audio hyperlink (404). Identifying (422) a URI (424) associated with the audio hyperlink (404) according to the method of FIG. 7 includes retrieving (520) from a data structure a URI (410) in dependence upon an instruction (420). Upon receiving an instruction (420) to invoke the audio hyperlink (404), the method of FIG. 7 continues by retrieving from an audio hyperlink data structure (404) the URI associated with the audio hyperlink and requesting access to the resource identified by the URI.

The use of an audio hyperlink data structure is for explanation and not for limitation. In fact, audio hyperlinks may be implemented in a number of ways. Audio hyperlinks may also be implemented through an improved anchor element which is a markup language element. Such an anchor element may be improved to invoke audio hyperlinks. Consider for further explanation the following exemplary anchor element improved to implement an audio hyperlink:

```
<audioHyperlink href=\\SrvrX\ResourceY playBackTime=00:08:44:44
file=someFile.mp3 grammar ID = grammar123>
Some_Audio_Sound_ID
</audioHyperlink>
```

This example anchor element includes a start tag <audioHyperlink>, and end tag </audioHyperlink>, which is an href attribute that identifies the target of the audio hyperlink as a resource named 'ResourceY' on a web server named 'SrvrX,' and an audio anchor. The "audio anchor" is an audio indication of the existence of the audio hyperlink the identification of which is set forth between the start tag and the end tag. That is, in this example, the anchor is an audio sound identified by the identification "Some_Auido_Sound_ID." Such an audio indication when played is designed to make a user aware of the audio hyperlink. The anchor element also identifies a palyback time of 00:08:44 in file someFile.mp3 as the playback time for playing the audio indication and identifies grammar ID=grammar123 as a grammar including keywords for speech invocation of the audio hyperlink.

Audio hyperlinks advantageously provide added functionality to audio files allowing users to access additional resources through invoking the audio hyperlinks. To provide users with those additional resources audio files may be annotated with an audio hyperlink. For further explanation, FIG. 8 sets forth a flow chart illustrating an exemplary method for annotating an audio file with an audio hyperlink. The method of FIG. 8 includes receiving (602) an identification of a playback time (406) in an audio file (402) to associate with an audio hyperlink. Receiving an identification of a playback time in an audio file to have an associated audio hyperlink may include receiving a user instruction during the recording of the audio file. Receiving (602) an identification of a playback time (406) in an audio file (402) in such cases may be carried out by receiving a user instruction through an input devices, such as for example buttons on an audio file recorder to indicate a playback time for associating an audio hyperlink. Receiving (602) an identification of a playback time (406) in an audio file (402) for an associated audio hyperlink may also be carried out through the use of a tool such as an audio hyperlink file annotation tool on a computer such as the audio hyperlink file annotation tool discussed below with reference to FIG. 10.

Receiving an identification of a playback time in an audio file to associate with an audio hyperlink may also include receiving a user instruction after the recording of the audio file. Receiving (602) an identification of a playback time (406) in an audio file (402) to associate with an audio hyperlink in such cases may be facilitated by use of a tool running on a computer such as the audio hyperlink file annotation tool discussed below with reference to FIG. 10. Such tools may include input widgets designed to receive from a user an identification of a playback time to associate with an audio hyperlink.

Figure 8:
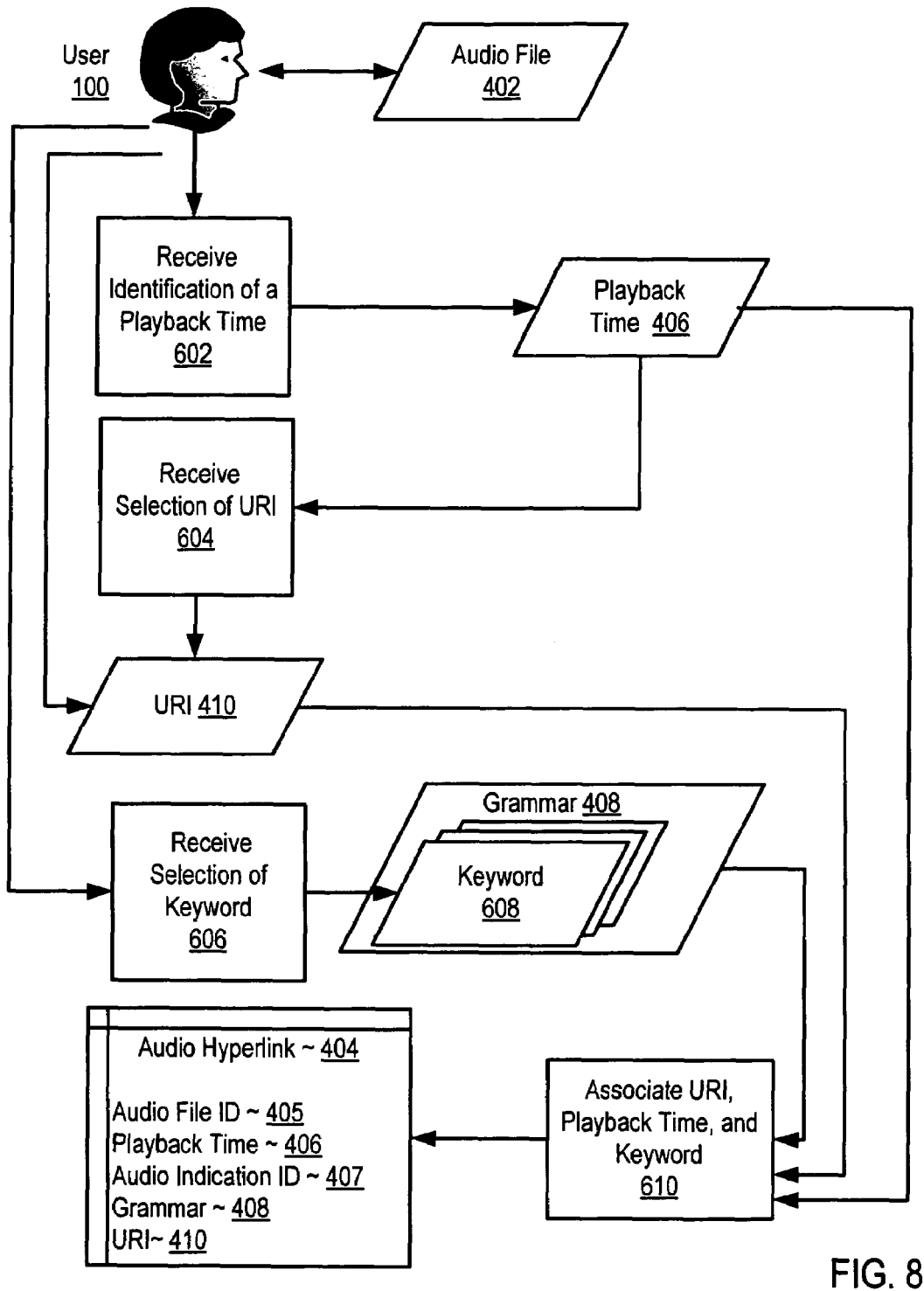
FIG. 8 sets forth a flow chart illustrating an exemplary method for annotating an audio file with an audio hyperlink.

The method of FIG. 8 also includes receiving (604) a selection of a URI (410) identifying a resource to be accessed upon the invocation of the audio hyperlink. Receiving (604) a selection of a URI (410) identifying a resource to be accessed upon the invocation of the audio hyperlink may be carried out by use of a tool running on a computer such as the audio hyperlink file annotation tool discussed below with reference to FIG. 10. Such tools may include input widgets designed to facilitate a users entry of a URI identifying a resource to be accessed upon invoking the audio hyperlink.

The method of FIG. 8 also includes receiving (606) a selection of one or more keywords (608) for invoking the audio hyperlink. Receiving (606) a selection of one or more keywords (608) for invoking the audio hyperlink may be carried out by use of a tool running on a computer such as the audio hyperlink file annotation tool discussed below with reference to FIG. 10. Such tools may include input widgets designed to facilitate a users entry of one or more keywords creating a grammar for invoking an audio hyperlink.

The method of FIG. 8 also includes associating (610) with the playback time (406) in the audio file (402) the URI (410), and the one or more keywords (608). Associating (610) with the playback time (406) in the audio file (402) the URI (410) and the one or more keywords (608) may be carried out by creating an audio hyperlink data structure (404) including an identification of the playback time (406), a grammar (408), and the URI (410). As discussed above, an audio hyperlink data structure (404) is a data structure available to an audio file player that supports audio hyper linking according to the present invention containing information useful in invoking an audio hyperlink. The audio hyperlink data structure (404) of FIG. 4 includes an audio file ID (405) uniquely identifying the audio file having an associated audio hyperlink. The audio hyperlink data structure (404) of FIG. 4 also includes a playback time (406) identifying a playback time in the audio file having an associated audio hyperlink. The Audio hyperlink data structure of FIG. 8 includes an audio indication ID (407) uniquely identifying the audio indication for the audio hyperlink. The audio hyperlink data structure (404) of FIG. 8 includes a grammar (408) including keywords for speech invocation of the audio hyperlink. The audio hyperlink data structure (404) of FIG. 8 also includes a URI (410) identifying a resource referenced by the audio hyperlink.

Associating (610) with the playback time (406) in the audio file (402) the URI (410), and the one or more keywords (608) may also be carried out through an improved markup language anchor element. Such an anchor element may be improved to invoke audio hyperlinks as discussed above.

Associating (610) with the playback time (406) in the audio file (402) the URI (410) and the one or more keywords (608) may also include creating an audio hyperlink markup document including an identification of the playback time, a grammar, and a URI. An audio hyperlink markup document includes any collection of text and markup associating with a playback time in audio file and URI and one or more keywords for invoking the audio hyperlink. For further explanation, consider the following exemplary audio hyperlink markup document:

```
<audio hyperlink markup document>
    <Audio Hyperlink ID = 1>
        <Playback Time>
            00:03:14:45
        <Playback Time>
        <Grammar>
        "Play link" "Invoke" "Go to Link" "Play"
        </Grammar>
        <URI>
        http://www.someURI.com
        </URI>
    </Audio Hyperlink ID = 1>
    <Audio Hyperlink ID = 2>
        <Playback Time>
            00:14:02:33
        <Playback Time>
        <Grammar>
        "Go" "Do It" Play link" "Invoke" "Go to Link" "Play"
        </Grammar>
        <URI>
        http://www.someOtherWebSite.com
        </URI>
    </Audio Hyperlink ID = 1>
    ...
</audio hyperlink markup document>
```

The audio hyperlink markup document in the example above includes a plurality of audio hyperlinks including two audio hyperlinks identified as audio hyperlink ID=1 and audio hyperlink ID=2 by the tags <Audio Hyperlink ID=1></Audio Hyperlink ID=1> and <Audio Hyperlink ID=2></Audio Hyperlink ID=2>. Audio hyperlink ID=1 is an audio hyperlink associated with playback time of 00:03:14:45 in an audio file. The audio hyperlink references the URI 'http://www.someURI.com' which may be invoked by use of the following speech keywords "Play link" "Invoke" "Go to Link" "Play" that make up a grammar for speech invocation of the audio hyperlink.

Audio hyperlink ID=2 is an audio hyperlink associated with playback time of 00:14:02:33 in an audio file. The audio hyperlink references a URI 'http://www.someOtherWebSite.com' which may be invoked by use of the following speech keywords "Go" "Do It" "Play link" "Invoke" "Go to Link" "Play" in an associated grammar for speech invocation of the audio hyperlink.

The exemplary audio hyperlink markup document is for explanation and not for limitation. In fact, audio hyperlink markup documents may be implemented in many forms and all such forms are well within the scope of the present invention.

Figure 9:
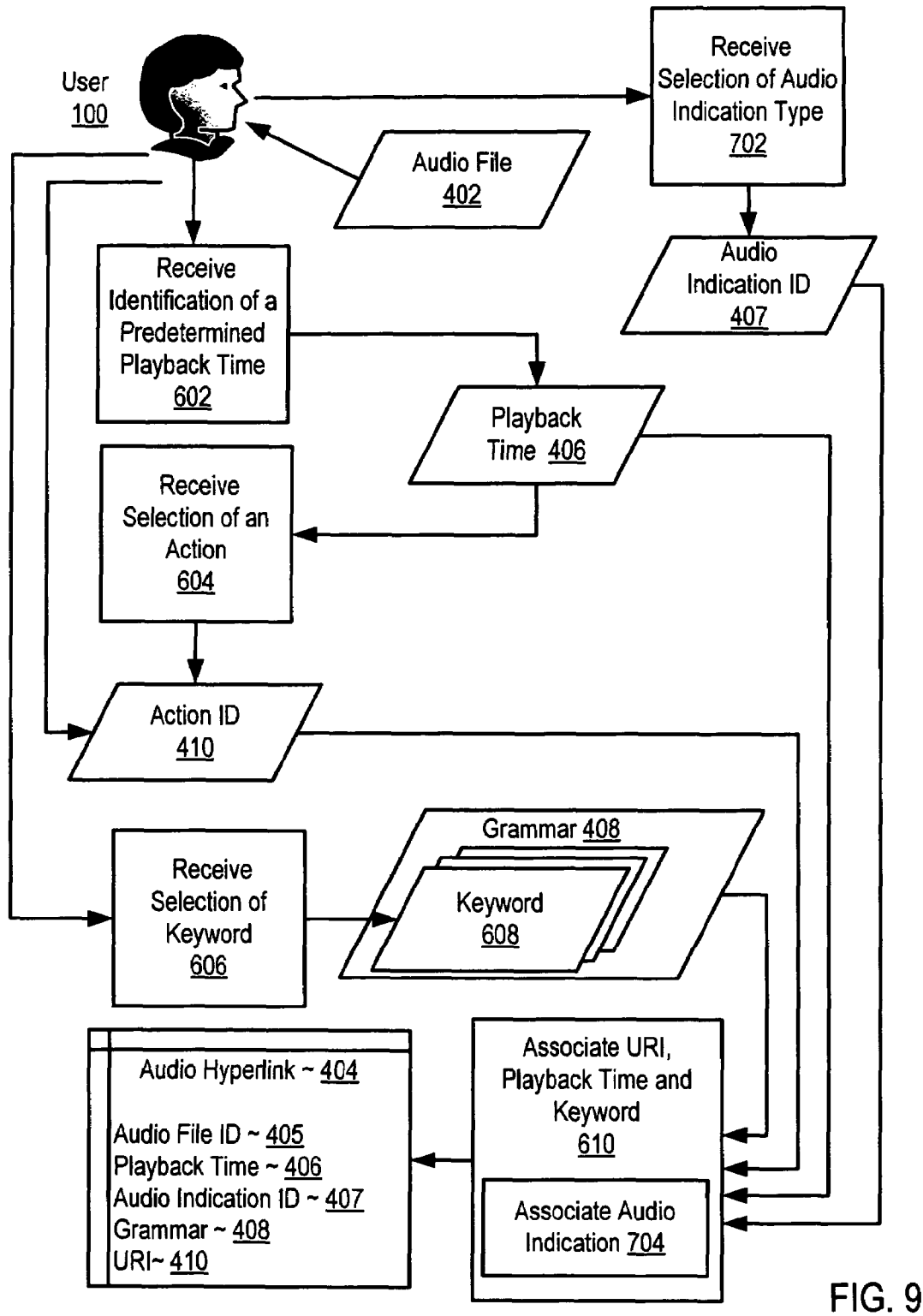
FIG. 9 sets forth a flow chart illustrating another exemplary method for annotating an audio file with an audio hyperlink.

For further explanation, FIG. 9 sets forth a flow chart illustrating another exemplary method for annotating an audio file with an audio hyperlink. The method of FIG. 9 is similar to the method of FIG. 8 in that the method of FIG. 9 includes receiving (602) an identification of a playback time (406) in an audio file (402) to associate with an audio hyperlink; receiving (604) a selection of a URI (410) identifying a resource to be accessed upon the invocation of the audio hyperlink; receiving (606) a selection of one or more keywords (608) for invoking the audio hyperlink; and associating (610) with the playback time (406) in the audio file (402) the URI (410), and the one or more keywords (608). The method of FIG. 9, however, also includes receiving (702) a selection of an associate audio indication (704) for identifying of the existence of the audio hyperlink (404) during playback of the audio file (402).

In the method of FIG. 9, associating (610) with the playback time (406) in the audio file (402) the URI (410), and the one or more keywords (608) also includes associating with the playback time (406) the audio indication (704). Associating with the playback time (406) the audio indication (704) may be carried out through the use of an audio hyperlink data structure, an improved anchor element, an audio hyperlink markup document and in other ways as will occur to those of skill in the art.

Figure 10:
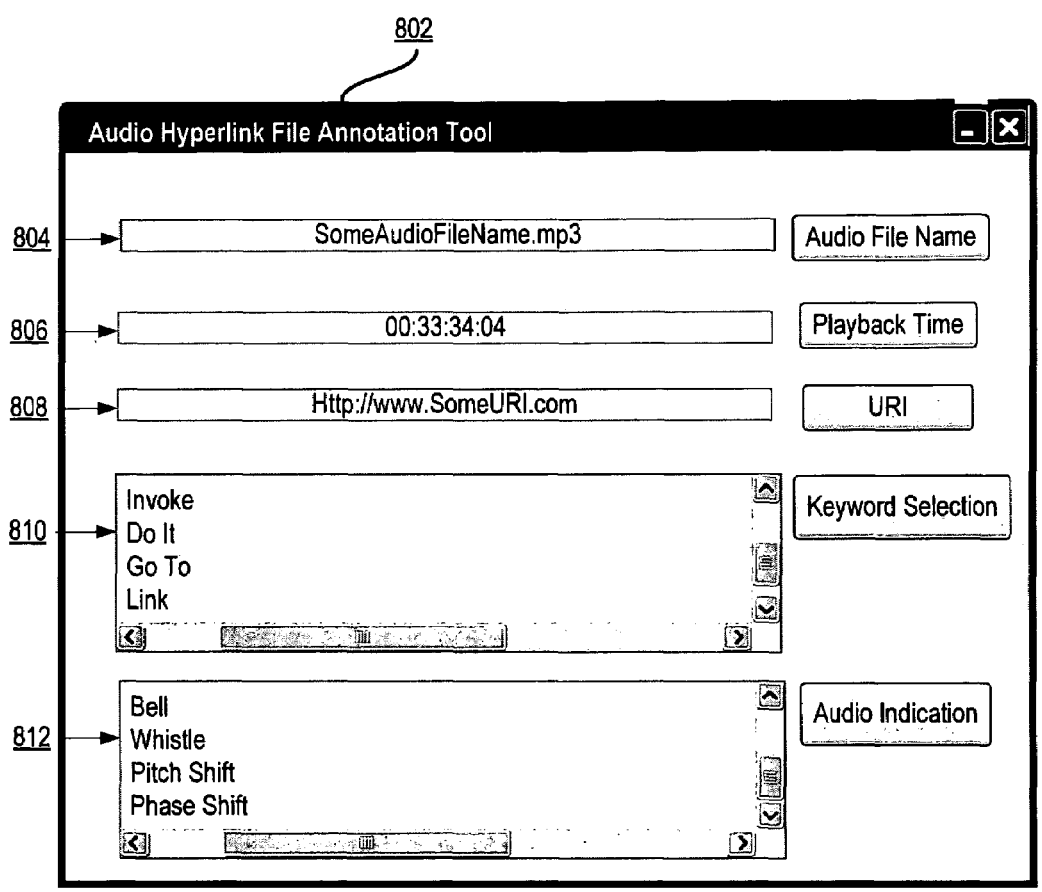
FIG. 10 sets forth a line drawing of an audio hyperlink file annotation tool useful in annotating an audio file with an audio hyperlink according to the present invention.

As discussed above, annotating an audio file with an audio hyperlink may be facilitated by use of audio hyperlink GUI screens. For further explanation, therefore FIG. 10 sets forth a line drawing of an audio hyperlink file annotation tool (802) useful in annotating an audio file with an audio hyperlink according to the present invention. The audio hyperlink file annotation tool (802) of FIG. 10 includes a GUI input widget (804) for receiving a user selection of an audio file to be annotated by inclusion of an audio hyperlink. In the example of FIG. 10, the audio file called 'SomeAudioFileName.mp3' has been selected for annotation to include an audio hyperlink.

The audio hyperlink file annotation tool (802) of FIG. 10 includes a GUI input widget (806) for receiving a user selection of playback time in the audio file to have an associated audio hyperlink. In the example of FIG. 10, the audio file called 'SomeAudioFileName.mp3' has been selected for annotation to include an audio hyperlink at playback time 00:00:34:04.

The audio hyperlink file annotation tool (802) of FIG. 10 includes a GUI input widget (808) for receiving a user selection of a URI identifying a resource accessible by invoking the audio hyperlink. In the example of FIG. 10, the URI 'http:///www.someURI.com' is selected associated with the audio hyperlink.

The audio hyperlink file annotation tool (802) of FIG. 10 also includes a GUI selection widget (810) for receiving a user selection of one or more keywords creating a grammar for speech invocation of the audio hyperlink. In the example of FIG. 10, available predetermined keywords include 'invoke,' 'Do It,' 'Go to,' and 'Link.' The pre-selected keywords are presented in the example of FIG. 10 for explanation and not for limitation. In fact, any keywords may be associated with an audio hyperlink either by providing a list of such words for user selection or providing for user input of keywords as will occur of those of skill in the art.

The audio hyperlink file annotation tool (802) of FIG. 10 also includes a GUI selection widget (812) for receiving a user selection of an audio indication identifying to a user the existence of the audio hyperlink. In the example of FIG. 10, possible audio indications include a bell sound, a whistle sound, pitch-shifting the playback and phase-shifting the playback of the audio file.

Exemplary embodiments of the present invention are described largely in the context of a fully functional computer system for invoking an audio hyperlink. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for invoking an audio hyperlink, the method comprising:

providing a user with an option to either enter a first keyword of the user's choice or select a second keyword provided to the user, either the first keyword or the second keyword being configured for use in a speech instruction to invoke the audio hyperlink;

storing a plurality of keywords to be included in a grammar, the plurality of keywords comprising either the first keyword or the second keyword;

identifying, through an audio anchor element, a predetermined playback time in an audio file pre-designated as having an association with the audio hyperlink;

wherein the audio anchor element is a markup language element that identifies the audio file pre-designated as having an association with the audio hyperlink, a Uniform Resource Identifier ('URI') identifying a target resource associated with the audio hyperlink, an audio indication of the audio hyperlink, the predetermined playback time in the audio file pre-designated as having an association with the audio hyperlink, and the grammar including the plurality of keywords for speech invocation of a respective plurality of hyperlinks including the audio hyperlink;

playing the audio indication of the audio hyperlink at the predetermined playback time;

receiving from the user the speech instruction to invoke the audio hyperlink;

identifying, through the audio anchor element, the URI associated with the audio hyperlink; and invoking the URI.

2. The method of claim 1 wherein the audio file comprises an audio subcomponent of a file also including video.

3. The method of claim 1 wherein identifying a predetermined playback time in an audio file pre-designated as having an associated audio hyperlink further comprise retrieving from the audio anchor element a playback time in the audio file pre-designated as having an audio hyperlink.

4. The method of claim 1 wherein playing an audio indication of the audio hyperlink further comprises:

retrieving from the audio anchor element an audio indication ID identifying an audio indication of the audio hyperlink; and augmenting the sound of the audio file in accordance with the audio indication ID.

5. The method of claim 1 wherein receiving from a user a speech instruction to invoke the audio hyperlink further comprises:

receiving speech from a user;

converting the speech to text; and comparing the text to the grammar.

6. The method of claim 1 wherein identifying a URI associated with the audio hyperlink includes retrieving from the audio anchor element the URI in dependence upon a user speech instruction.

7. The method of claim 1, further comprising:

receiving user input entering the second keyword for use in a speech instruction to invoke the audio hyperlink; and associating the second keyword with the audio hyperlink which points to the URI.

8. A system for invoking an audio hyperlink, the system comprising a computer processor, a computer memory operatively coupled to the computer processor, the computer memory having disposed within it computer program instructions capable of:

providing a user with an option to either enter a first keyword of the user's choice or select a second keyword provided to the user, either the first keyword or the second keyword being configured for use in a speech instruction to invoke the audio hyperlink;

storing a plurality of keywords to be included in a grammar, the plurality of keywords comprising either the first keyword or the second keyword;

identifying, through an audio anchor element, a predetermined playback time in an audio file pre-designated as having an association with the audio hyperlink;

wherein the audio anchor element is a markup language element that identifies the audio file pre-designated as having an association with the audio hyperlink, a Uniform Resource Identifier ('URI') identifying a target resource associated with the audio hyperlink, an audio indication of the audio hyperlink, the predetermined playback time in the audio file pre-designated as having an association with the audio hyperlink, and the grammar including the plurality of keywords for speech invocation of a respective plurality of hyperlinks including the audio hyperlink;

playing the audio indication of the audio hyperlink at the predetermined playback time;

receiving from the user the speech instruction to invoke the audio hyperlink;

identifying, through the audio anchor element, the URI associated with the audio hyperlink; and invoking the URI.

9. The system of claim 8 wherein the audio file comprises an audio subcomponent of a file also including video.

10. The system of claim 8 wherein the computer memory also has disposed within it computer program instructions capable of retrieving from the audio anchor element a playback time in the audio file pre-designated as having the audio hyperlink.

11. The system of claim 8 wherein the computer memory also has disposed within it computer program instructions capable of:

retrieving from the audio anchor element an audio indication ID identifying an audio indication of the audio hyperlink; and augmenting the sound of the audio file in accordance with the audio indication ID.

12. The system of claim 8 wherein the computer memory also has disposed within it computer program instructions capable of:

receiving speech from a user;

converting the speech to text; and comparing the text to a grammar.

13. The system of claim 8 wherein the computer memory also has disposed within it computer program instructions capable of retrieving from the audio anchor element the URI in dependence upon a user speech instruction.

14. The system of claim 8, wherein the computer memory also has disposed within it computer program instructions capable of:

receiving user input entering the second keyword for use in a speech instruction to invoke the audio hyperlink; and associating the second keyword with the audio hyperlink which points to the URI.

15. A computer program product for invoking an audio hyperlink, the computer program product embodied on a non-transitory computer-readable medium, the computer program product comprising:

computer program instructions for providing a user with an option to either enter a first keyword of the user's choice or select a second keyword provided to the user, either the first keyword or the second keyword being configured for use in a speech instruction to invoke the audio hyperlink;

computer program instructions for storing a plurality of keywords to be included in a grammar, the plurality of keywords comprising either the first keyword or the second keyword;

computer program instructions for identifying, through an audio anchor element, a predetermined playback time in an audio file pre-designated as having an association with the audio hyperlink;

wherein the audio anchor element is a markup language element that identifies the audio file pre-designated as having an association with the audio hyperlink, a Uniform Resource Identifier ('URI') identifying a target resource associated with the audio hyperlink, an audio indication of the audio hyperlink, the predetermined playback time in the audio file pre-designated as having an association with the audio hyperlink, and the grammar including the plurality of keywords for speech invocation of a respective plurality of hyperlinks including the audio hyperlink;

computer program instructions for playing the audio indication of the audio hyperlink at the predetermined playback time;

computer program instructions for receiving from a user the speech instruction to invoke the audio hyperlink;

computer program instructions for identifying, through an audio anchor element, the URI associated with the audio hyperlink; and computer program instructions for invoking the URI.

16. The computer program product of claim 15 wherein the audio file comprises an audio subcomponent of a file also including video.

17. The computer program product of claim 15 wherein computer program instructions for identifying a predetermined playback time in an audio file pre-designated as having an associated audio hyperlink further comprise computer program instructions for retrieving from the audio anchor element a playback time in the audio file pre-designated as having an audio hyperlink.

18. The computer program product of claim 15 wherein computer program instructions for playing an audio indication of the audio hyperlink further comprise:

computer program instructions for retrieving from the audio anchor element an audio indication ID identifying an audio indication of the audio hyperlink; and computer program instructions for augmenting the sound of the audio file in accordance with the audio indication ID.

19. The computer program product of claim 15 wherein computer program instructions for receiving from the user the speech instruction to invoke the audio hyperlink further comprise:

computer program instructions for receiving speech from the user;

computer program instructions for converting the speech to text; and computer program instructions for comparing the text to the grammar.

20. The computer program product of claim 15 wherein computer program instructions for identifying a URI associated with the audio hyperlink includes computer program instructions for retrieving from the audio anchor element the URI in dependence upon the user speech instruction.

21. The computer program product of claim 15 wherein computer program instructions for playing an audio indication of the audio hyperlink further comprise:

receiving user input entering the second keyword for use in a speech instruction to invoke the audio hyperlink; and associating the second keyword with the audio hyperlink which points to the URI.

* * * * *